(12) United States Patent
Achterman

(10) Patent No.: US 7,503,341 B1
(45) Date of Patent: Mar. 17, 2009

(54) SELF CLEANING FLOW SHUTOFF VALVE AND ASSOCIATED METHODS

(75) Inventor: Kermit L. Achterman, La Canada Flintridge, CA (US)

(73) Assignee: Kermit L. Achterman & Associates, Inc., La Canada Flintridge, CA (US)

( * ) Notice: Subject to any disclaimer, the term of this patent is extended or adjusted under 35 U.S.C. 154(b) by 0 days.

(21) Appl. No.: 12/170,721

(22) Filed: Jul. 10, 2008

Related U.S. Application Data

(63) Continuation-in-part of application No. 11/689,104, filed on Mar. 21, 2007, which is a continuation-in-part of application No. 11/535,194, filed on Sep. 26, 2006.

(51) Int. Cl.
*F16K 17/30* (2006.01)

(52) U.S. Cl. .................. 137/498; 137/516.27

(58) Field of Classification Search .......... 137/517, 137/516.27, 498, 497, 460
See application file for complete search history.

(56) References Cited

U.S. PATENT DOCUMENTS

| | | | | |
|---|---|---|---|---|
| 735,248 A * | 8/1903 | Hahn | ............... | 137/533.13 |
| 1,796,455 A * | 3/1931 | Gunn et al. | ............ | 137/515.5 |
| 2,307,949 A * | 1/1943 | Phillips | ............ | 137/498 |
| 2,415,258 A * | 2/1947 | Parker et al. | ............ | 137/539.5 |
| 2,460,407 A * | 2/1949 | Andrus | ............ | 138/46 |
| 2,481,713 A * | 9/1949 | Bertea | ............ | 137/515.5 |
| 2,912,000 A * | 11/1959 | Green | ............ | 137/515.5 |
| 2,924,237 A * | 2/1960 | Ellis | ............ | 137/599.18 |
| 3,441,052 A * | 4/1969 | Schilling | ............ | 137/517 |
| 3,566,918 A | 3/1971 | Rauen | | |
| 3,664,371 A * | 5/1972 | Schneider | ............ | 137/516.29 |
| 3,735,777 A | 5/1973 | Katzer et al. | | |
| 3,850,195 A * | 11/1974 | Olsson | ............ | 137/503 |
| 3,958,603 A * | 5/1976 | Bannon et al. | ............ | 138/43 |
| 5,240,036 A | 8/1993 | Morris | | |
| 5,487,406 A | 1/1996 | Jirasek | | |
| 5,857,716 A | 1/1999 | Thomas | | |
| 5,976,631 A | 11/1999 | Ramachandran | | |
| 6,325,090 B1 | 12/2001 | Horne et al. | | |
| 7,111,638 B2 | 9/2006 | Johnson | | |

OTHER PUBLICATIONS

Non-Final Office Action from USPTO dated Aug. 4, 2008 for relating U.S. Appl. No. 11/535,194.
Non-Final Office Action from USPTO dated Oct. 7, 2008 for relating U.S. Appl. No. 11/689,104.

* cited by examiner

*Primary Examiner*—John Rivell
*Assistant Examiner*—Macade Brown
(74) *Attorney, Agent, or Firm*—Klein, O'Neill & Singh, LLP

(57) ABSTRACT

The present flow shutoff valve comprises a flow metering sleeve positioned within a flow passage. The sleeve and a housing of the valve define an annular space. The sleeve includes a flow metering aperture downstream of the annular space. A valve member is slidably mounted within the sleeve. The valve member is movable between a no flow position, a normal flow position and a shutoff position. The valve is self cleaning, so that it reduces the buildup of sediment within the valve.

22 Claims, 19 Drawing Sheets

US 7,503,341 B1

SELF CLEANING FLOW SHUTOFF VALVE AND ASSOCIATED METHODS

CROSS-REFERENCE TO RELATED APPLICATIONS

This application is a continuation-in-part of pending application Ser. No. 11/689,104, filed on Mar. 21, 2007, which is a continuation-in-part of pending application Ser. No. 11/535,194, filed on Sep. 26, 2006. The disclosures of both of the prior co-pending applications are incorporated by herein by reference in their entireties.

BACKGROUND OF THE INVENTION

1. Field of the Invention

The present embodiments are related to flow shutoff valves for water lines, and, more specifically, self-cleaning flow shutoff valves.

2. Description of Related Art

Shutoff valves to prevent excess flow, such as when a sudden leak occurs downstream of the valve, are well known in the art. Such valves are found in high pressure hydraulic systems, fueling systems and critical gas systems. Such valves are relatively expensive because of complicated housings and/or valve elements, costly materials, and precision machining requirements.

Public water supplies to appliances, sinks and toilets are often connected to manual shutoff valves that are installed in the water line. The conventional means for connecting the manual shutoff valves to an appliance, or the like, are typically through flexible hoses. Personal experience and insurance statistics suggest that a great many such manual shutoff valves are not closed when appliances are not in use. Consequently, the integrity of the flexible hoses remains the only means of containing water pressure to an appliance. Insurance companies in North America report payments amounting to hundreds of millions of dollars annually that solely result from broken appliance hoses. Other statistics for sinks and toilet systems, not using flexible hoses, but which are subject to leaking or other problems, are similar.

The shutoff valves used for hydraulics, fuels and gases are out of practical range for use with appliances. However, other solutions have been applied to the problem of flooding from appliance hoses in a number of ways. Electrical sensors, timers and valve drives have been devised. Mechanical devices have also been employed, but are complicated, expensive and/or limited in their use.

One problem that must be addressed by shutoff devices is the presence of particles and hardness in the water supply, which can accumulate to disable such valves. The utility of most shutoff valves is as an emergency device with very infrequent actuation. Consequently, interfering deposits can build up with continued flow through the valve without actuation and result in malfunction of the valve when needed.

SUMMARY OF THE INVENTION

The preferred embodiments of the present self-cleaning flow shutoff valve and associated methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description of the Preferred Embodiments," one will understand how the features of the present embodiments provide advantages, which include reliable actuation and self-cleaning, which reduces the buildup of sediment deposits that can lead to clogs and subsequent malfunctions.

The present embodiments are directed to a flow shutoff valve for public water line pressure, wherein the valve includes a housing defining an inlet and an outlet, a valve element slidably mounted in the housing, and a spring biasing the valve element. The housing includes a passage therethrough between the inlet and the outlet, the passage having at least a first cylindrical section. The valve element includes a sealing surface that is engageable with a valve seat around the passage in the housing. A flow restrictive passage is located between the inlet and the outlet with communication therethrough controlled by the valve element.

In a first separate aspect of the present embodiments, the valve element includes a cylindrical wall slidably engaging the first cylindrical section of the passage through the housing. Communication through the flow restrictive passage is closed with the valve element at the inlet end of its slidable mounting. Under this condition, the valve element operates as a piston through a distance responsive to the water pressure each time water begins to flow through the valve, performing a forced physical cleaning.

In a second separate aspect of the present embodiments, the valve element includes a cavity open to the inlet. The flow restrictive passage includes at least one restrictive orifice extending from the cavity to the periphery of the valve element. The restrictive orifice(s) is closed by the first cylindrical section with the valve element at the inlet end of its slidable mounting.

In a third separate aspect of the present embodiments, back pressure at the outlet dropping to near zero gauge pressure results in a force on the valve element greater than and opposed to the force of the spring. Further, the spring has a spring force with the valve element in the no-flow position that is less than the total force of the water line pressure on the valve element with the back pressure of the outlet at near zero gauge pressure.

In a fourth separate aspect of the present embodiments, the flow shutoff valve includes a motion damper operatively coupled between the housing and the valve element. This damper may include damping that is progressive with displacement. The motion damper may include a cavity and a plunger. The plunger can have an increasing cross-sectional area with increasing distance from the free end of the plunger for a first length of the plunger.

In a fifth separate aspect of the present embodiments, the flow shutoff valve includes a flexible hose having a proximal end attached to the outlet and a distal end, a line filter adjacent the distal end of the flexible hose and no line filter adjacent the proximal end of the hose or the flow shutoff valve.

In a sixth separate aspect of the present embodiments, any of the foregoing aspects are contemplated to be employed in combination to greater utility.

In a seventh separate aspect of the present embodiments, the flow shutoff valve for public water line pressure is adapted to be used with or made integral with a stop valve for use with sinks, toilets and the like.

In an eighth separate aspect of the present embodiments, the flow shutoff valve is made more compact and smaller so as to be integrated with known stop valves, and it includes a poppet guide and metering slot insert with one or more metering slots therein for flow control therethrough.

Another embodiment of the present self cleaning flow shutoff valve is configured to be installed in a water lien to stop flow in response to an excess water flow condition. The valve comprises a housing defining a flow passage and a valve seat. A flow-metering element is positioned within the flow passage. The flow-metering element includes a flow metering aperture on a downstream portion thereof. The flow metering aperture provides fluid communication through a body wall of the element. A valve member is slidably mounted within the flow-metering element. The valve member is movable between a no flow position, a normal flow position and a shutoff position. A downstream end of the valve member includes a sealing portion configured to selectively engage the valve seat. A biasing element is disposed between the housing and the valve member so as to bias the valve member away from the valve seat. When the valve member is in the no flow position, an upstream end of the valve member engages the housing adjacent an inlet end of the housing, the sealing portion is spaced from the valve seat, and the valve member does not cover the flow metering aperture. When the valve member is in the normal flow position, the upstream end of the valve member is spaced from the housing, the sealing portion is spaced from the valve seat, and the valve member does not cover the flow metering aperture. When the valve member is in the shutoff position, the upstream end of the valve member is spaced from the housing, the sealing portion engages the valve seat, and the valve member covers the flow metering aperture.

One embodiment of the present methods comprises stopping flow in a water line in response to an excess water flow condition. The method comprises the step of beginning with a flow shutoff valve in the water line in a no flow position in which an upstream end of a valve member engages a housing of the valve adjacent an inlet end of the housing, a sealing portion of the valve member is spaced from a valve seat located downstream of the valve member, and the valve member does not cover the flow metering aperture. A differential pressure is created across the valve member in which a downstream water pressure is less than an upstream water pressure to move the valve member to a normal flow position in which the upstream end of the valve member is spaced from the housing, the sealing portion is spaced from the valve seat, and the valve member does not cover the flow metering aperture. A water flow rate across the valve member is increased above a threshold flow rate to move the valve member to a shutoff position in which the upstream end of the valve member is spaced from the housing, the sealing portion engages the valve seat, and the valve member covers the flow metering aperture. When the valve member is in the normal flow position, water flows past the upstream end of the valve member, then through an annular space defined between an inner surface of the housing and an outer surface of the flow-metering element, then through the flow metering aperture and around a downstream end of the valve member and then past the valve seat.

BRIEF DESCRIPTION OF THE DRAWINGS

The preferred embodiments of the present self-cleaning flow shutoff valve and associated methods now will be discussed in detail with an emphasis on highlighting the advantageous features. These embodiments depict the novel and non-obvious valve shown in the accompanying drawings, which are for illustrative purposes only. These drawings include the following figures, in which like numerals indicate like parts.

DETAILED DESCRIPTION OF THE PREFERRED EMBODIMENTS

Figure 1:
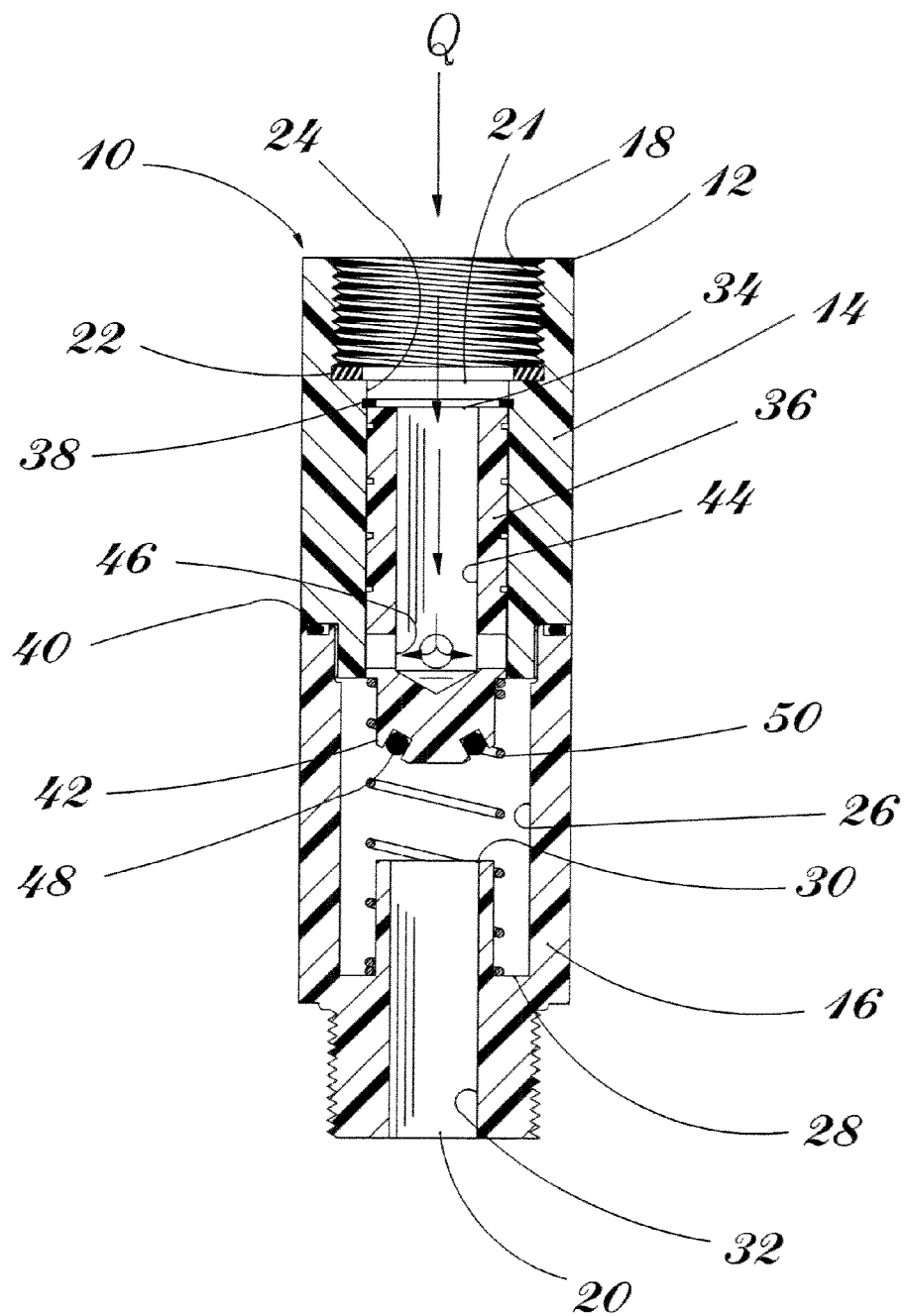
FIG. 1 is a cross-sectional view taken along the centerline of a flow shutoff valve in a position with no flow therethrough.

In the detailed description that follows, the present embodiments are described with reference to the drawings. In the drawings, elements of the present embodiments are labeled with reference numbers. These reference numbers are reproduced below in connection with the discussion of the corresponding drawing features.

Figure 2:
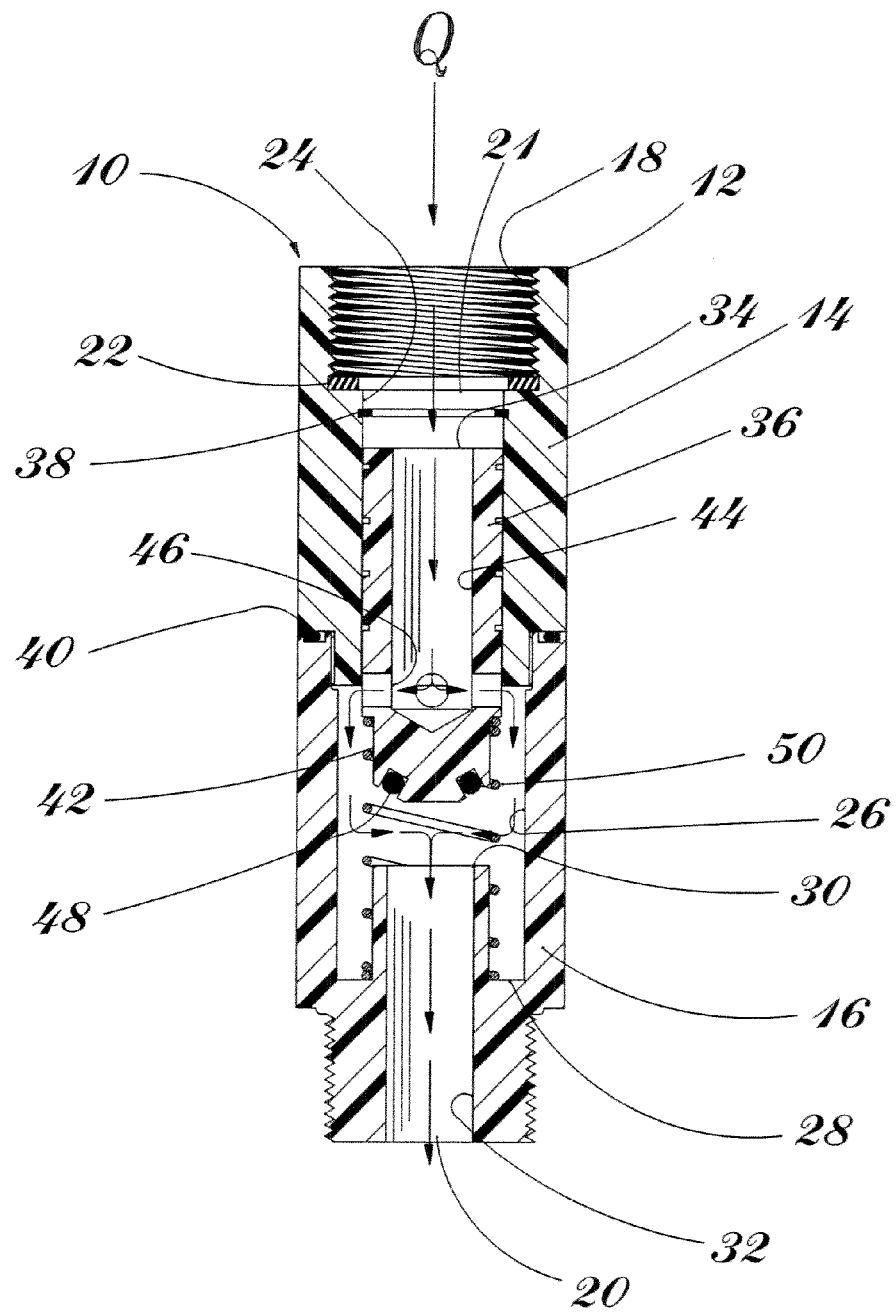
FIG. 2 is a cross-sectional view taken along the centerline of the flow shutoff valve in an intermediate position with flow therethrough.
Figure 3:
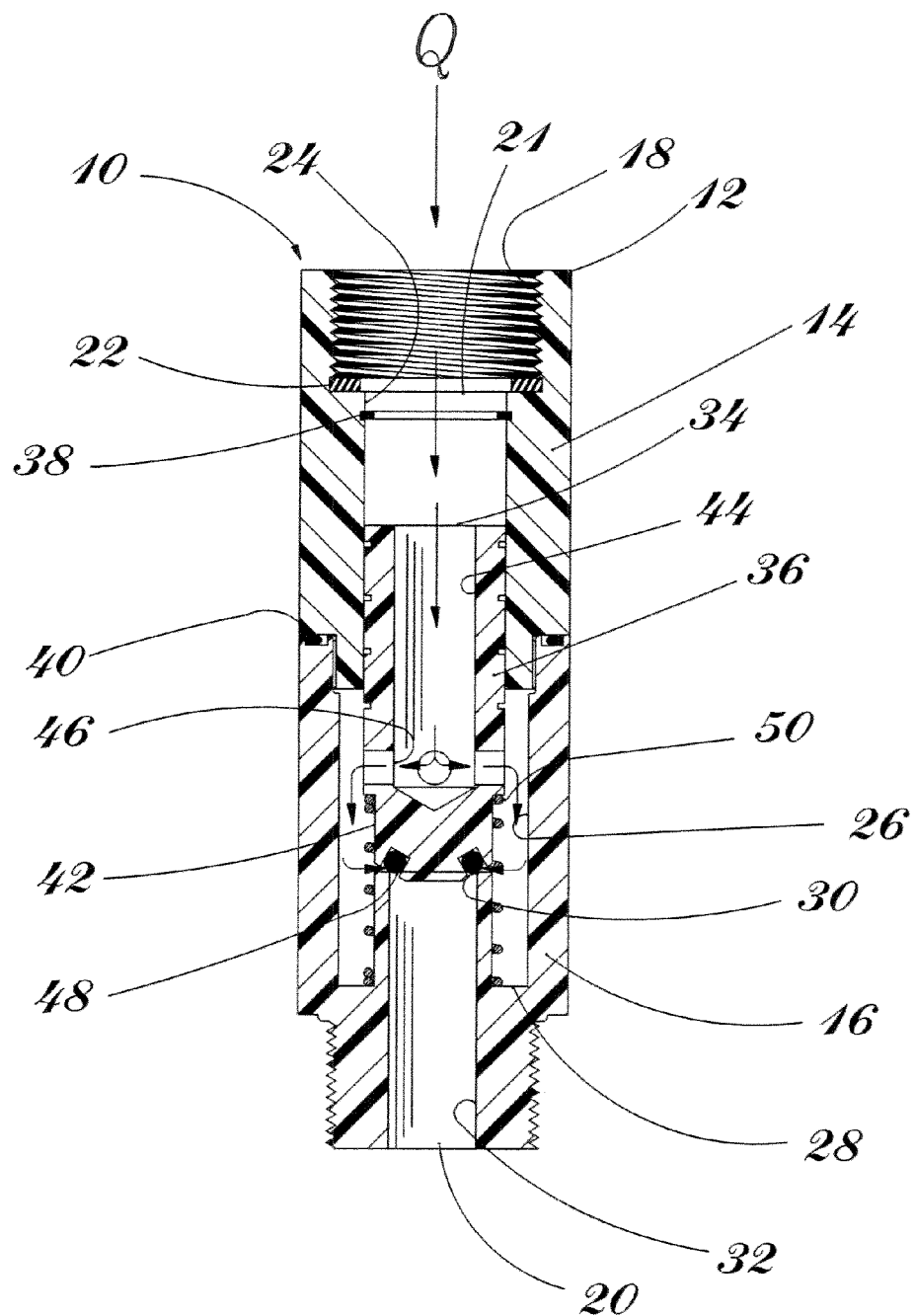
FIG. 3 is a cross-sectional view taken along the centerline of a flow shutoff valve in a shutoff position.

Turning in detail to FIGS. 1-3, a self-cleaning flow shutoff valve for public water line pressure is disclosed. The flow shutoff valve, generally designated 10, includes a housing 12. The housing 12 is constructed of an inlet section 14, and an outlet section 16. These sections may conveniently be of inexpensive plastic molding material. Such materials include polyvinyl chloride (PVC), chlorinated polyvinyl chloride (CPVC), acrylonitrile butadiene styrene (ABS) and other plastics. Brass or bronze may alternatively be employed. The sections 14, 16 are generally cylindrical. "Cylindrical" is used herein in the broader mathematical sense without necessarily being limited to a circular cylinder.

The inlet section 14 includes an inlet 18. The outlet section 16 includes an outlet 20. The inlet 18 and outlet 20 sections are shown to be threaded with female and male threads, respectively. The entire body of the housing 12 is preferably cylindrical at any cross section and the two sections 14, 16 include male and female engaged pilot diameters. The two sections 14, 16 may be bonded together or threaded together with an o-ring seal 40.

The resulting housing 12 defined by the two sections 14, 16 includes a passage 21 therethrough extending from the inlet 18 to the outlet 20. The passage 21 includes a washer 22 arranged at the inlet to prevent flow from backing out through the inlet 18.

The passage 21 further includes a cylindrical section 24 found inwardly of the inlet 18 and washer 22. This section 24 extends to a central section 26 of enlarged cross section also forming part of the passage 21. At one end of the central section 26, an annular spring seat 28 is arranged to accommodate a spring inwardly displaced from the wall of the passage 21 at the central section 26. A valve seat 30 is also located in the central section 26 at the annular spring seat 28. The valve seat 30 extends around the passage 21 as it defines an outlet channel 32.

A valve element 34 includes a cylindrical wall about its periphery which slidably engages the cylindrical section 24. The body 36 of the valve element 34 is of sufficient length and fit so that it will not bind with the cylindrical bore 24 in movement within the passage 21 and yet precludes any substantial flow between the cylindrical wall and the cylindrical section 24. The clearance between the body 36 and the cylindrical bore 24 is small but does not require that all fluid flow therebetween be prevented. A retaining ring 38 fits within a groove in the passage 21 at the first section 24. A spring clip may be employed for this ring 38. This limits the travel of the valve element 34 toward the inlet 18. A nose 42 of smaller diameter than the body 36 extends downwardly below the cylindrical wall of the body 36. A flow restrictive passage is located between the inlet and the outlet with communication therethrough controlled by the valve element 34.

In the preferred embodiment, the flow restrictive passage is defined by a central cavity 44 extending into the body of the valve element 34 from the inlet end. The cavity 44 does not extend fully through the valve element 34. Rather, several orifices 46 extend from the cavity 44 in a radial direction to the periphery of the valve element 34 for communication between the inlet and the outlet. Further the central section 26 can provide communication from the orifices 46 to the valve seat 30. A sealing surface 48 is arranged on the end of the nose 42 to cooperate with the valve seat 30 for closure of the passage 21. A spring 50 is positioned in the annular spring seat 28 and is placed in compression against the shoulder created by the diameter change in the valve element 34. The spring 50 biases the valve element 34 toward the inlet and against the retaining ring 38.

In comparing FIGS. 1, 2 and 3, it may be noted that the valve element 34 is shown in three functional positions. A first position, as illustrated in FIG. 1, is with the valve element 34 positioned fully toward the inlet 18. A second position, as illustrated in FIG. 2, is an intermediate position with the orifices 46 in communication with the central section 26 and the valve 10 open. The second position actually spans a range of locations for the valve element 34. A third position, as illustrated in FIG. 3, is with the sealing surface 48 pressed against the valve seat 30. In the first position, the orifices 46 are closed by the cylindrical section 24 which closely surrounds the cylindrical periphery of the valve element 34. In this way, communication through the flow restrictive passage is closed. With no open passage, pressure builds up on the top of the valve element 34, which, in turn, acts as a piston and is forced downwardly by the water pressure every time the valve is opened. With the added force of the piston, the valve element 34 is cleared of any accumulation of particles and hardness on a regular basis. Further, the valve remains open with the sealing surface 48 displaced from the valve seat 30.

In the second position, flow proceeds relatively unimpeded by the mechanism with the exception of the design of the orifices 46. Under normal flow conditions, the valve element 34 remains in this intermediate position. In the third position, the sealing surface 48 is on the valve seat 30 and there is no flow. It is through this range of positions that the flow shutoff valve 10 operates.

The spring 50 and the orifices 46 are empirically selected to accommodate public water line pressure and household appliance flow rates. At normal flow, there is some pressure drop across the valve element 34. This pressure drop is due to flow resistance through the orifices 46 and general drag on the valve element 34. This pressure drop along with pressure imbalances resulting from velocity variations around the valve element 34 provides differential forces on the valve element 34. However, the orifices 46 and the spring 50 are selected to allow a certain range of flow through the flow shutoff valve 10 at a range of line pressures with the spring 50 retaining the valve element 34 in the intermediate zone of positions. This is accomplished by having the spring maintain a range of force on the valve element 34 that the hydraulic forces do not move the valve element 34 fully to the third position against the valve seat 30. Naturally, the spring 50 cannot resist the piston action of the valve element 34 as it moves from the first position to expose the orifices 46. As the public water line pressure is reasonably stable during such flow, the back pressure at the outlet 20 significantly determines flow rate. This back pressure is developed at an appliance or other device in fluid communication with the outlet 20.

When the back pressure at the outlet 20 drops significantly, the differential pressure between the inlet 18 and the outlet 20 becomes substantially greater. In response, flow through the flow shutoff valve 10 increases. As the flow increases, greater resistance is provided by the orifices 46. Resulting hydraulic forces acting in the direction of flow increase. At a flow rate between 150% and 200% of anticipated normal flow, the resulting hydraulic force on the valve element 44 exceeds the opposing spring force from the compressed spring 50. Preferably the spring 50 is arranged such that the distance between the first and third positions does not greatly increase the spring force. This is accomplished with some precompression of the spring 50 in the first position and a small spring constant. With the resulting hydraulic force exceeding the spring force, the valve element 34 will move to the third position with the sealing surface 48 against the annular valve seat 30. As the sealing surface 48 engages the valve seat 30, flow is terminated.

Once there is no flow, the pressure about the valve element 34 equalizes at the line pressure. At this point, the only forces on the valve element 34 are the spring 50 and the imbalance between the line pressure and the lower pressure at the outlet channel 32 operating on the valve element 34 inwardly of the valve seat 30. With the outlet 20 being near zero gauge pressure, the differential pressure across the area of the outlet channel 32 retains the valve element 34 in the third position. Reinstating the flow shutoff 10 to the first or second positions is accomplished by reducing the line pressure sufficiently so that the spring 50 may force the valve element 34 back toward the inlet 18.

Figure 5:
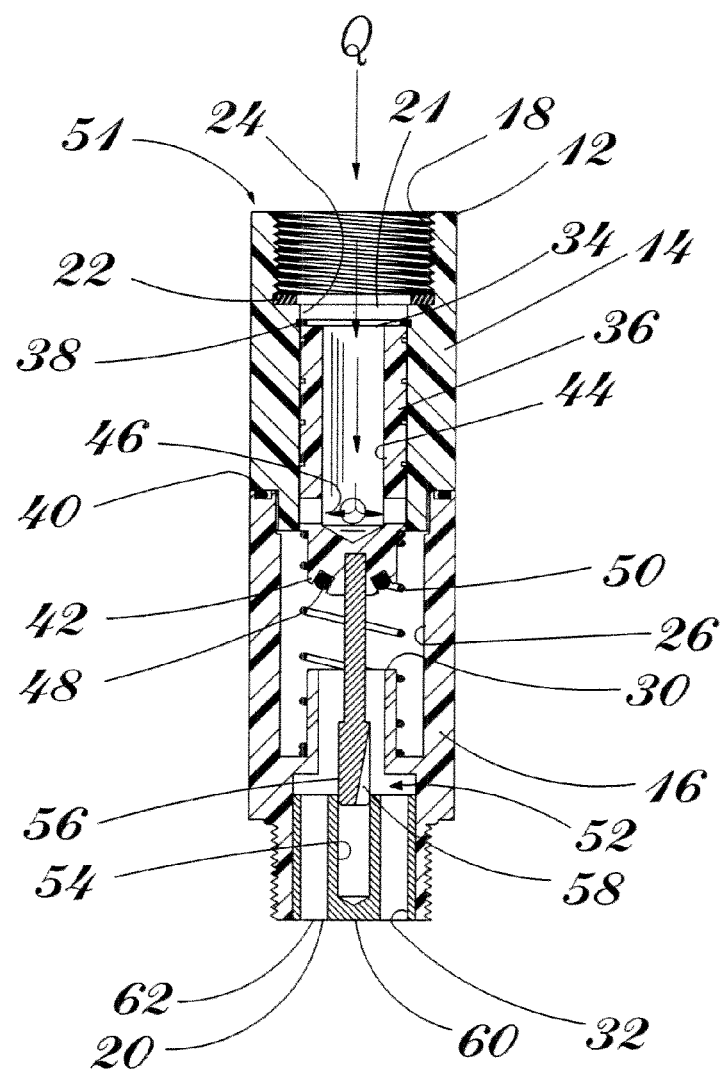
FIG. 5 is a cross-sectional view taken along lines 5-5 of FIG. 4.
Figure 4:
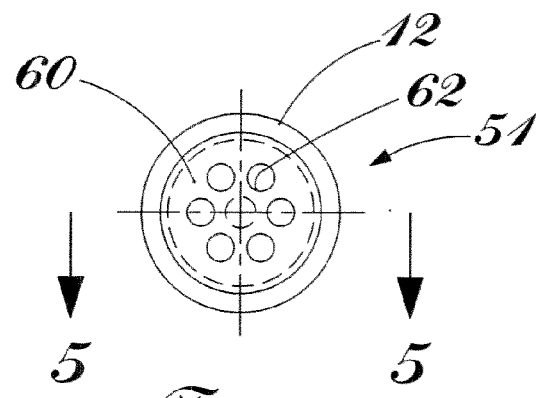
FIG. 4 is a bottom view of a second embodiment of a flow shutoff valve.

The second embodiment illustrated in FIGS. 4 and 5 includes the reference numbers applied to the first embodiment where functions are substantially identical. This second embodiment of the flow shutoff valve, generally designated 51 principally differs in the provision of a motion damper, generally designated 52. The motion damper includes a cavity 54 associated with the housing 12 and a plunger 56 associated with the valve element 34. The first position of the valve element 34, as seen in FIG. 5, as the plunger 56 just entering the cavity 54. In the intermediate position the plunger 56 has more fully entered into the cavity 54 but has not bottomed out. For a first distance, the plunger 56 increases in cross-sectional area by means of the chamfer 58. With this device, the damping resistance is progressive with displacement of the valve element 34 from the intermediate position toward the valve closed position.

To accommodate the motion damper 52, the housing 12 includes an insert 60, centrally defining the cavity 54, with multiple ports 62 thereabout. The ports are substantially larger in cumulative cross-section than the orifices 46. This allows a rapid drop in pressure below the valve element 34 with resulting closure of the shutoff valve 51 when pressure at the outlet 20 drops to near zero gauge. The insert 60 may be press fit or retained by bonding. A further variation from the first embodiment may be the employment of slip sockets, as the shutoff valve 51 is depicted in FIG. 7, particularly adaptable with PVC, CPVC and ABS type piping systems for bonding of the system components to the valve 51.

Figure 6:
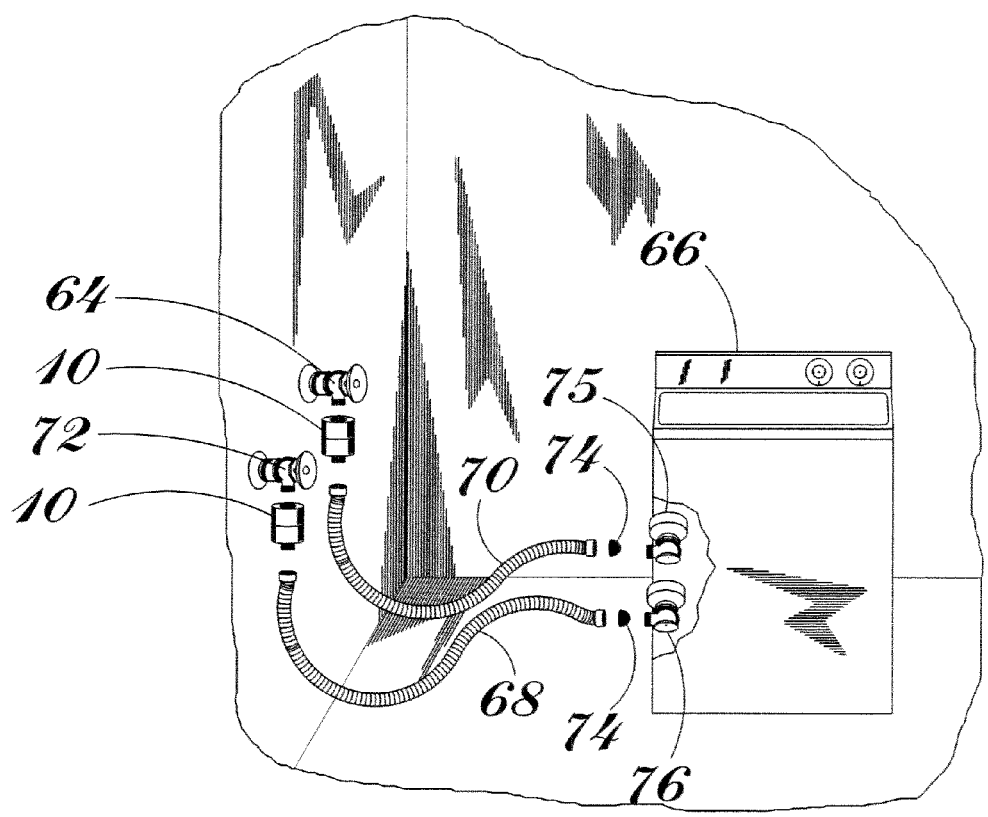
FIG. 6 is a perspective exploded assembly view of flow shutoff valves with an appliance.

FIG. 6 illustrates the use of flow shutoff valves 10 with a home appliance such as a washing machine 66. Flexible hoses 68, 70 are coupled with the flow shutoff valves 10 which are in turn coupled with the standard manual valves 64, 72. In the circumstance that a flexible hose 68, 70 breaks, water pressure within the hose and correspondingly at the outlet 20 would drop to near zero gauge pressure. Under this circumstance, the flow shutoff valve 10 would close by having the valve element 34 moved to the third position. The corresponding valve 64, 72 must then be closed before flow is restored through the flow shutoff valve 10.

The hoses 68 and 70 have proximal ends adjacent the shutoff valve 10 and distal ends at the appliance 66 or other device. A line filter 74 may be located adjacent the distal end of each of the hoses 68 and 70, where they connect to the appliance solenoid valves, 75 and 76, and no line filter is located adjacent the proximal end of the hoses 68 and 70 or the flow shutoff valve 10. As indicated above, particles and hardness accumulate from a domestic water line. If there is a filter before the flow shutoff valve 10, there is the danger of sufficiently clogging the line filter enough that flow would never reach the shutoff velocity through the flow shutoff valve 10 to properly actuate with a break in the hose. By placing line filters after the hoses, the increased flow from a break would not be reduced by an upstream clogged line filter.

Figure 7:
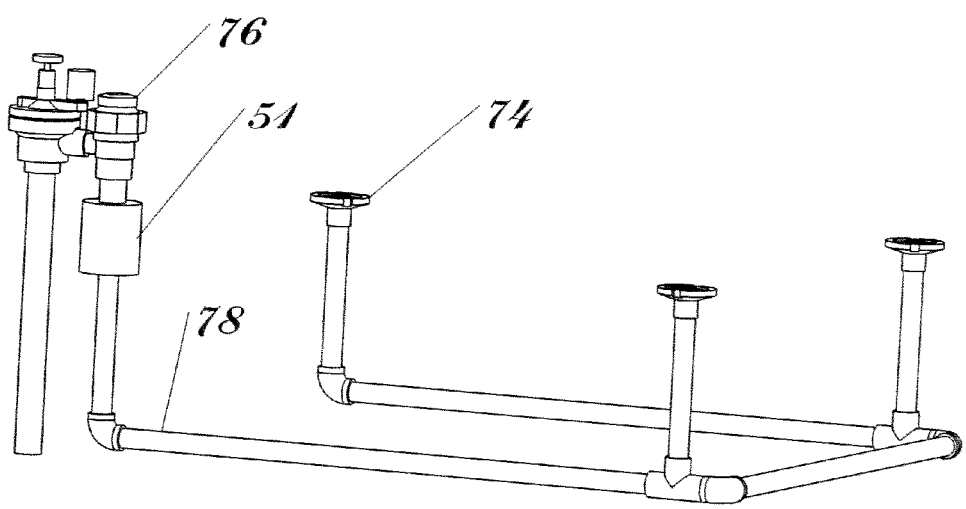
FIG. 7 is a perspective view of a flow shutoff valve with a sprinkler system.

FIG. 7 illustrates a sprinkler system including sprinklers 74, an anti-siphon valve 76 and sprinkler pipes 78. The motion damper 52 of the second embodiment has particular utility in the sprinkler system of FIG. 7. When the anti-siphon valve 76 is closed, the anti-siphon operates to release pressure and drain some of the sprinkler pipe 78. Therefore, when the anti-siphon valve is again opened, there is the possibility that the sprinkler piping 78, and correspondingly the outlet 20, will be at near zero gauge pressure until filled by line water. Without slowing the closure of the valve, this condition could prematurely close the shutoff valve.

Turning now to the third embodiment shown in FIGS. 8 through 11, a self cleaning flow shutoff valve for public water line pressures and for connection to or use with a stop valve is disclosed. This flow shutoff valve is a miniaturized version for use in specific situations and is generally designated 110. A currently preferred version of this miniaturized flow shutoff valve is approximately ¾ in. (19 mm) in diameter by about 1.4 in. (35.6 mm) long. This flow shutoff valve 110 includes a housing 112, preferably constructed from metal and having an inlet section 114, an outlet section 116, sealed with an O-ring 126, and an outlet adapter 118. An O-ring seal 150 is used between the outlet section 116 and the outlet adapter 118. The sections 114, 116, and 118 are generally cylindrical. "Cylindrical" is used herein in the broader mathematical sense without necessarily being limited to a circular cylinder.

The inlet section 114 includes an inlet 120. The outlet adapter 118 includes an outlet 122. The inlet section 114 and the outlet adapter 118 are shown to be threaded with exterior male treads. The exterior threads on inlet section 114 provide for integration of the valve 110 into or with a standard commercial stop valve, such as 123 (see FIG. 12). The threads on outlet adapter 118 are varied to match a broad range of plumbing requirements. The entire housing 112 is preferably cylindrical at any cross section and the two sections 114, 116 may be bonded or threaded together. A poppet guide and metering slot insert 124 (best shown in FIG. 11) is fitted into the smooth bore of the inlet section 114, and is sealed with two O-rings 126. This poppet guide and metering slot insert 124 is preferably made from a ceramic or a glass filled polypropylene.

The resulting housing 112 defined by the three sections 114, 116, and 118 includes a passage 121 therethrough extending from the inlet 120 to the outlet 122. The passage 121 further includes a series of metering slots 128 formed in the poppet guide and metering slot insert 124.

The passage 121 further includes a cylindrical section 130 found inwardly of the inlet 120. This section 130 is preferably formed in the poppet guide and metering slot insert 124 and extends to a central section 132 also forming part of the passage 121. At one end of the central section 132 an annular spring seat 134 is arranged to accommodate a spring 136 inwardly displaced from the wall of passage 121 at the central section 132. A valve seat 138 is also located in the central section 132 at an end of the annular spring seat 134. The valve seat 138 extends around the passage 121 as it defines an outlet channel 140.

A cylindrical poppet type valve element 142 slidably engages the cylindrical section 130 of the poppet guide and metering slot insert 124. The body 144 of valve element 142 is of sufficient length and fit so that it will not bind with the cylindrical bore 130 in movement within the passage 121 and yet precludes any substantial flow between the body 144 and the cylindrical section 130. The clearance between the body 144 and the cylindrical section 130 of the poppet guide and metering slot insert 124 does not require that all fluid flow therebetween be prevented.

A nose 146 of smaller diameter than the body 144 of the valve element 142 extends downwardly, below the cylindrical housing 112. A valve O-ring sealing surface 148 is fitted to the nose 146 of the valve element 142.

A flow restrictive passage is located between the inlet 120 and the outlet 122 with communication therethrough controlled by the width and number of metering slots 128 in the poppet guide and metering slot insert 124. In the preferred embodiment, the flow restrictive passage is defined as the metering slots 128 which are cut into, or otherwise formed in the insert 124.

The number and width of slots 128 determine the amount of flow restriction. Further, the central section 132 can provide communication from the metering slots 128 to the valve seat 138. The sealing surface 148 is arranged on the end of the nose 146 to cooperate with the valve seat 138 for closure of the passage 121.

The spring 136 is positioned in the annular spring seat 134 and is placed in compression against the shoulder create by the diameter change in the body 144 of the valve element 142. The spring 136 biases the valve element 142 toward the inlet 120.

Figure 8:
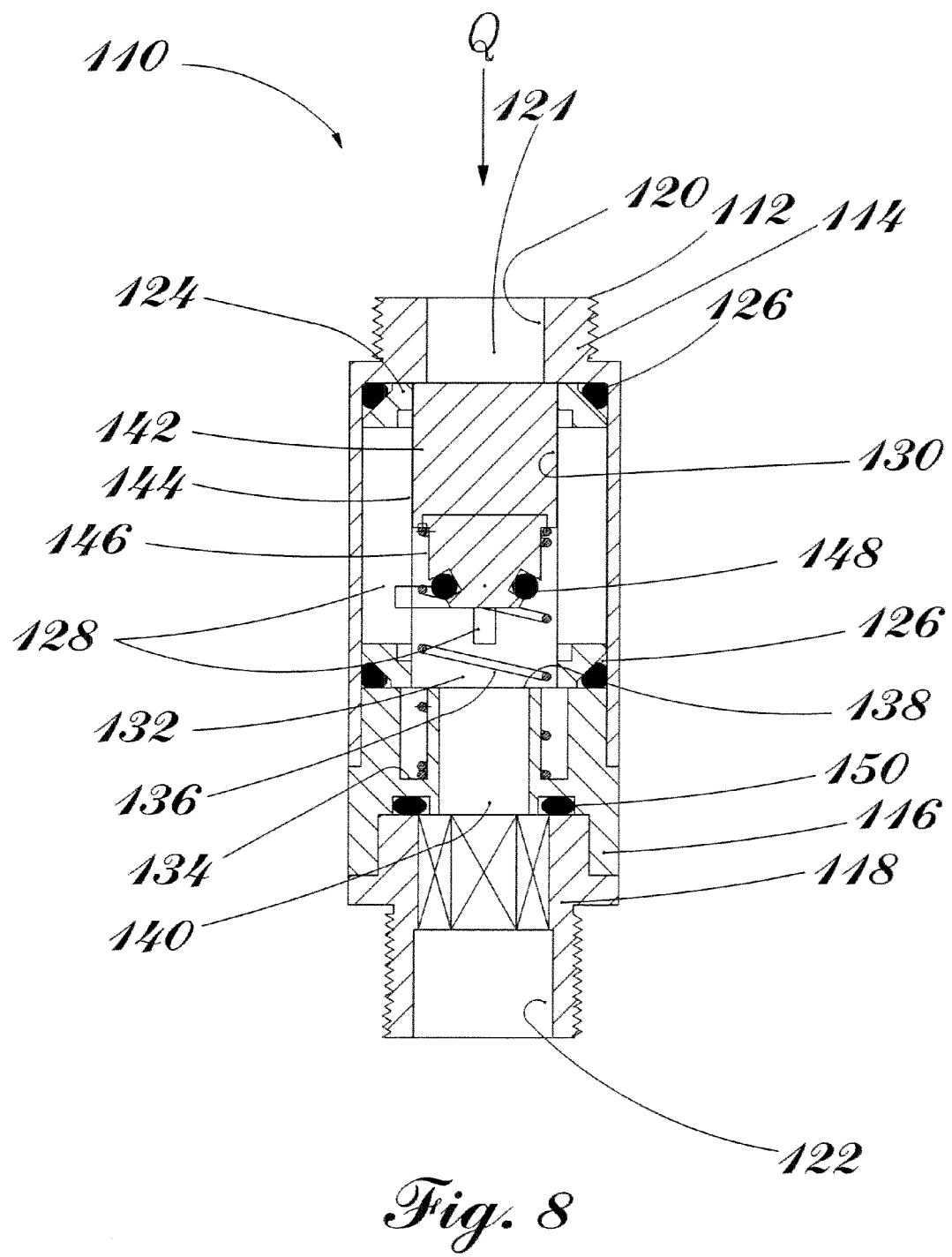
FIG. 8 is a cross-sectional view taken along the centerline of a third embodiment of a flow shutoff valve, in a position with no flow therethrough, for use with a stop valve.
Figure 9:
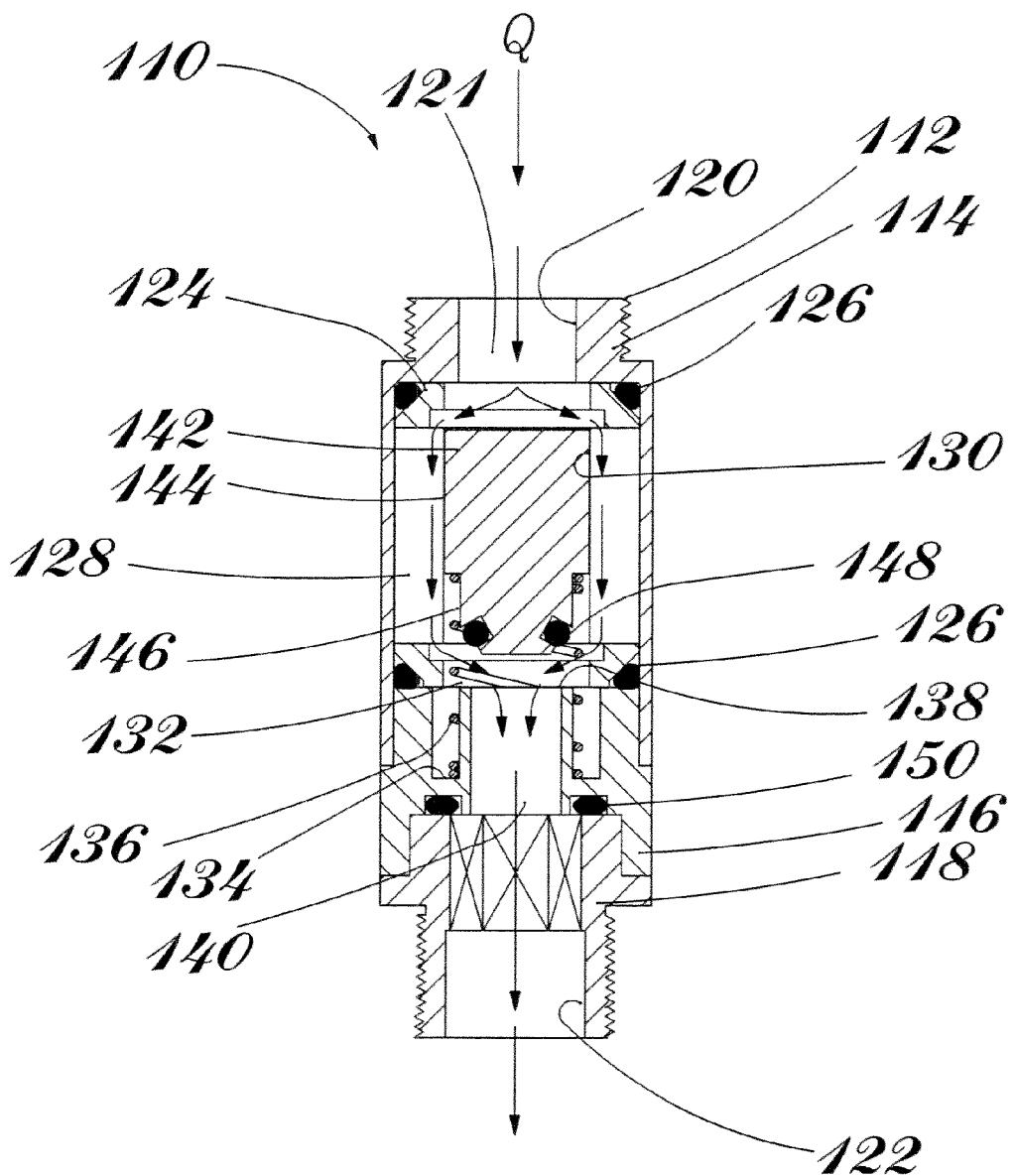
FIG. 9 is a cross-sectional view of the flow shutoff valve of FIG. 8, in an intermediate position with flow therethrough.
Figure 10:
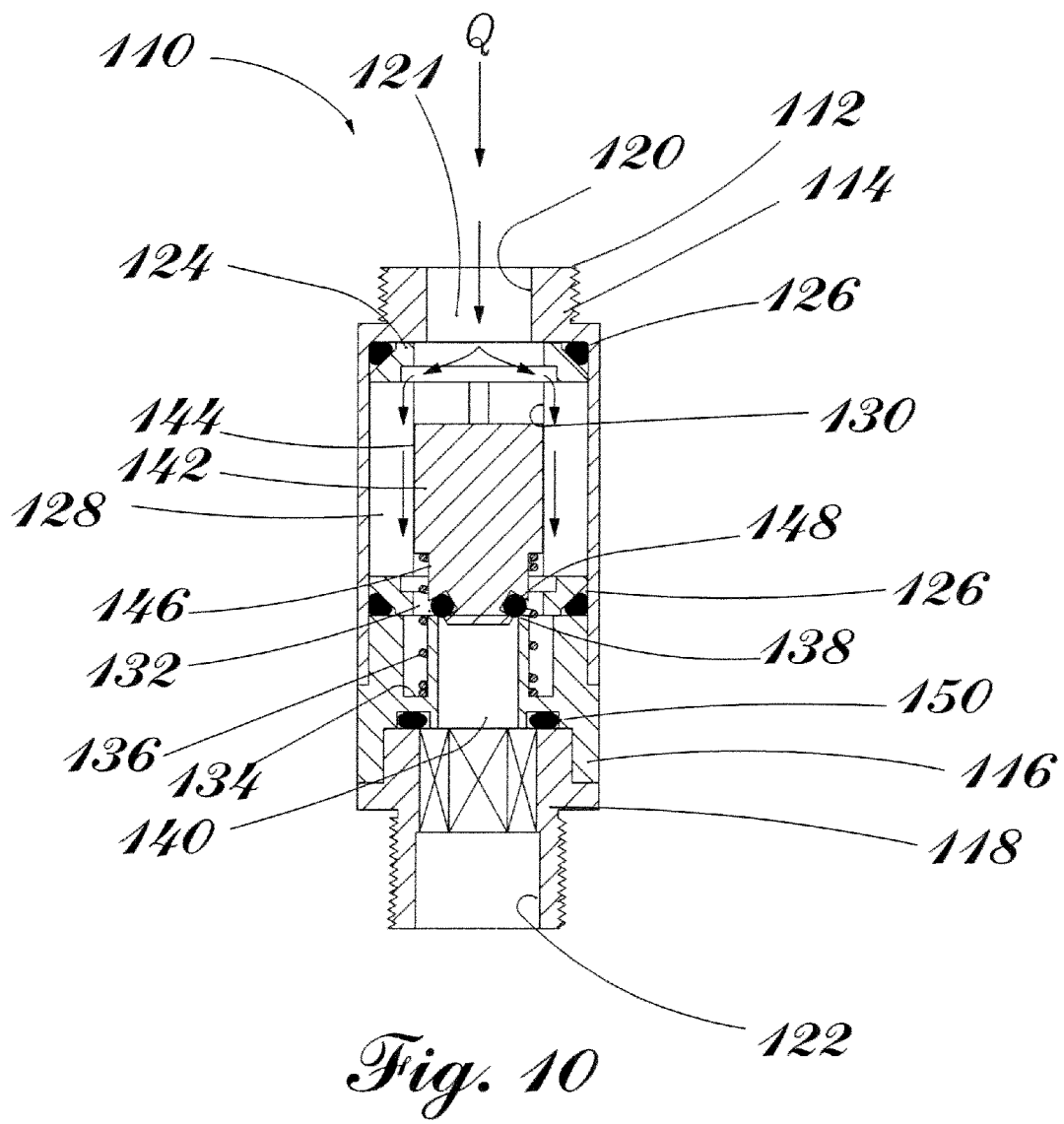
FIG. 10 is a cross-sectional view of the flow shutoff valve of FIG. 8, in a shutoff position.
Figure 11:
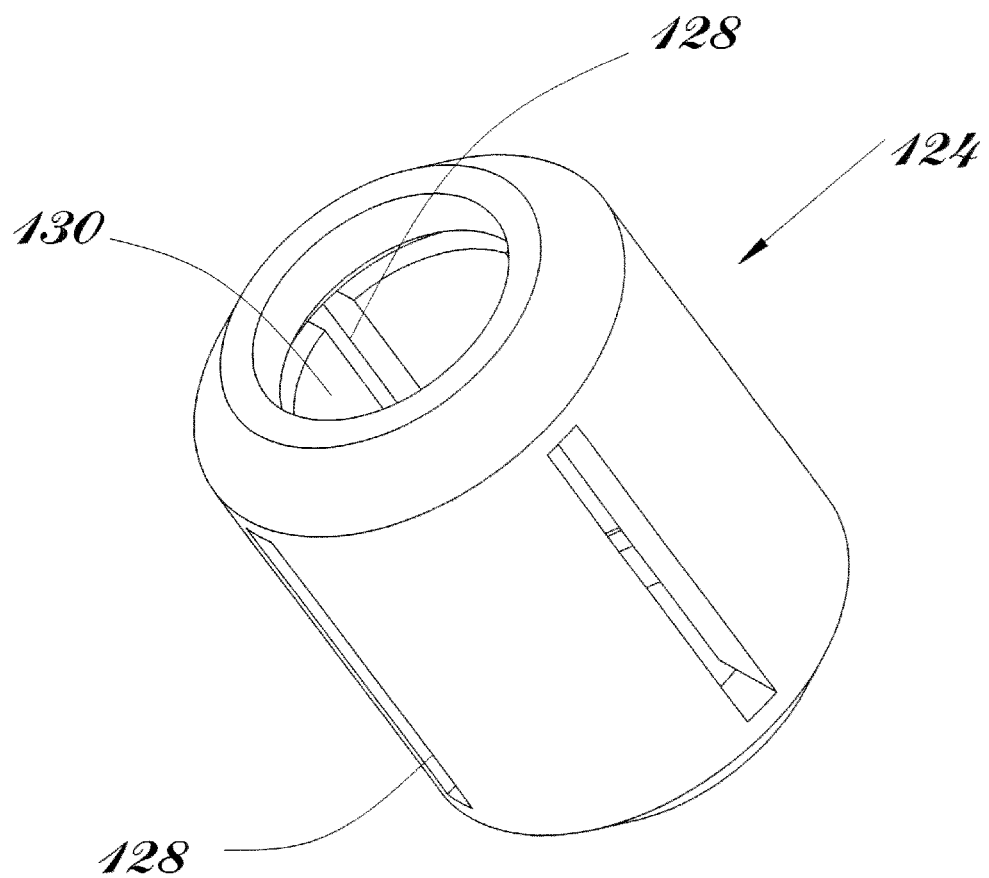
FIG. 11 is a perspective view of a poppet guide having a plurality of metering slots therein held in the housing of the flow shutoff valve of FIG. 8.

In comparing FIGS. 8, 9, and 10, it may be noted that the valve element 142 is shown in three functional positions. A first position, as illustrated in FIG. 8, is with the valve element 142 positioned fully toward the inlet 120, defining a valve closed position. A second position, as illustrated in FIG. 9, is an intermediate position with the metering slots 128 in communication with the inlet 120 and central section 132, defining a valve open position. The second position actually spans a rage of locations for the valve element 142. A third position, as illustrated in FIG. 10, is with the sealing surface o-ring 148 pressed against the valve seat 138, defining a further valve closed position. In the first position, the metering slots 128 are closed by the upper portion of the cylindrical section 144 of the valve element 142. In this way, communication through the flow restrictive passage is closed. With no open passage, pressure builds up on the top of the valve element 142, which, in turn, acts as a piston and is forced downwardly by the water pressure every time the supply valve is opened. With the added force of the piston, the valve element 142 is cleared of any accumulation of particles and hardness on a regular basis. Further, the valve remains open with the sealing surface 148 displaced from the valve seat 138.

In the second position, flow proceeds relatively unimpeded by the mechanism with the exception of the design of the metering slots 128. Under normal flow conditions, the valve element 142 remains in this intermediate position. In the third position, the sealing surface 148 is on the valve seat 138 and there is no flow. It is through this range of positions that the valve 110 operates.

The spring 136 and the metering slots 128 are empirically selected to accommodate public water line pressure and household appliance, sink, and toilet flow rates. At normal flow, there is some pressure drop across the valve element 142. This pressure drop is due to flow resistance through the metering slots 128 and general drag of the valve element 142. This pressure drop, along with pressure imbalance resulting from velocity variations around the valve element 142, provides differential forces on the valve element 142. However, the metering slots 128 and the spring 136 are selected to allow a certain range of flow through the flow shutoff valve 110 at a range of line pressures with the spring 136 retaining the valve element 142 in the intermediate zone of positions. This is accomplished by having the spring 136 maintain a range of force on the valve element 142 that the hydraulic forces do not move the valve element 142 fully to the third position against the valve seat 138. Naturally, the spring 136 cannot resist the piston action of the valve element 142 as it moves from the first position to expose the metering slots 128, thus providing the self-cleaning action. As the public water line pressure is reasonably stable during such flow, the back pressure at outlet 122 significantly determines flow rate. This pressure is developed at an appliance, toilet valve, sink valve, or other device in fluid communication with outlet 122.

When the back pressure at the outlet 122 drops significantly, the differential pressure between the inlet 120 and the outlet 122 becomes substantially greater. In response, flow through the flow shutoff valve 10 increases. As the flow increases, greater resistance is provided by the metering slots 128. Resulting hydraulic forces acting in the direction of flow increase. At a flow rate between 150% and 200% of anticipated normal flow, the resulting hydraulic force on the valve element 142 exceeds the opposing spring force from the compressed spring 136. This is accomplished with some pre-compression of the spring 136 in the first position and a small spring constant. With the resulting hydraulic force exceeding the spring force, the valve element 142 will move to the third position with the sealing surface 148 against the annular valve seat 138. As the sealing surface 148 engages the valve seat 138, flow is terminated.

Once there is no flow, the pressure about the valve element 142 equalizes at the line pressure. At this point, the only forces on the valve element 142 are the spring 136 and the imbalance between the line pressure at the inlet 120 and the lower pressure at the outlet 122 operating the valve element 142 inwardly of the valve seat 138. With the outlet 122 being near zero gauge pressure, the differential pressure across the area of the outlet channel 140 retains the valve element 142 in the third position. Reinstating the flow shutoff valve to the first or second position is accomplished by reducing the line pressure sufficiently so that the spring 136 may force the valve element 142 back toward the inlet 120.

Figure 12:
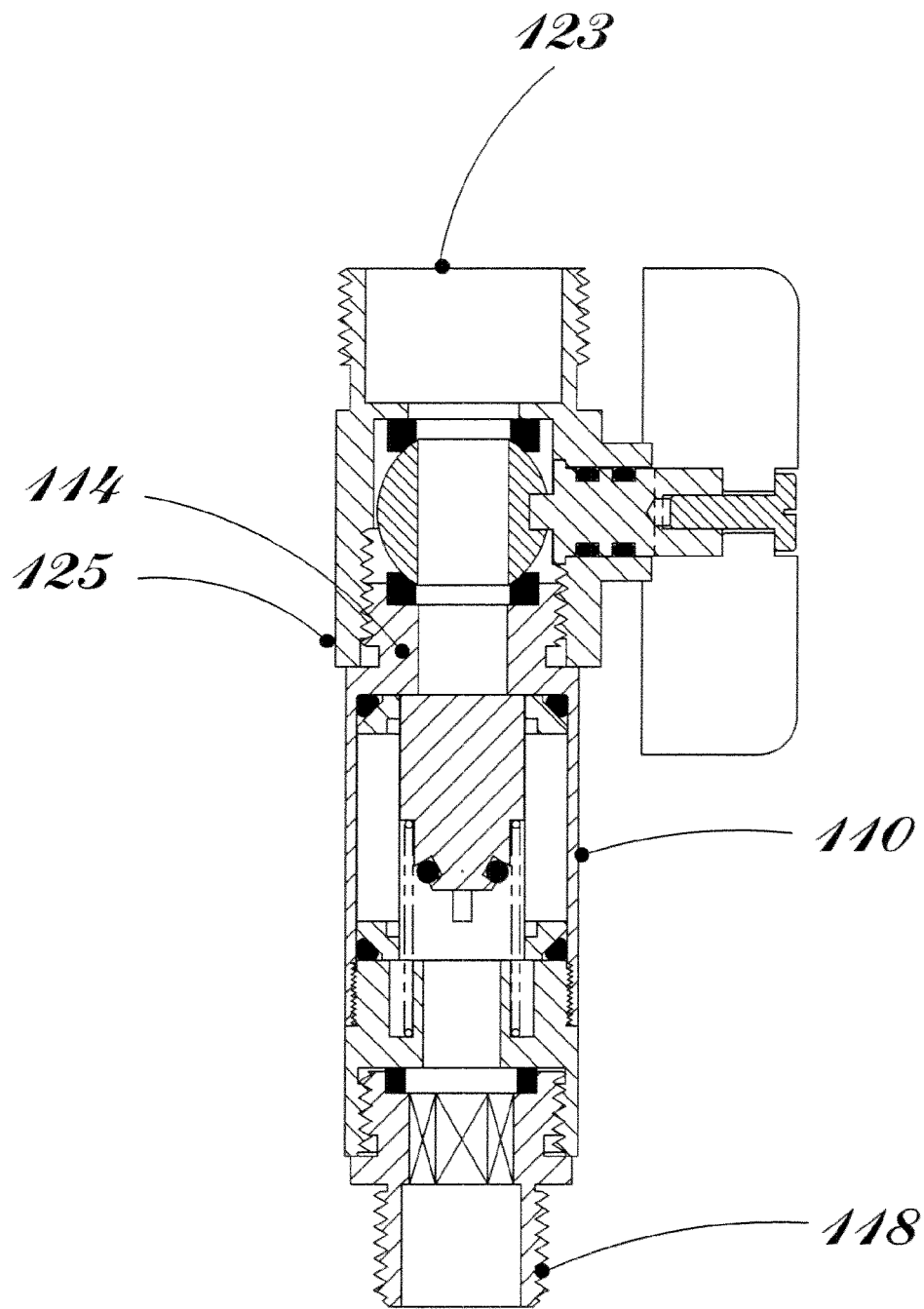
FIG. 12 is a cross-sectional view of the combination flow shutoff valve of FIG. 8 and a stop valve, with the flow shutoff valve, in a position with no flow therethrough.

FIG. 12 illustrates the connection or integration of flow shutoff valves 110 with sop valves 123. The exterior threads of the inlet section 114 are coupled to or inserted within female or internal threads formed on an outlet 125 of the stop valves 123 and retain a ball valve and O-ring or similar seal in place. The stop valves 123 may take any known configuration, such as a ¼ turn stop valve, and are coupled to a water line (not shown), feeding water to the shutoff valve for delivery elsewhere. If water pressure downstream of the shutoff valve 110 drops the near zero gauge pressure, the flow shutoff valve 110 would close to cut off water flow, without the need to close the stop valves 123, except to reset the flow shutoff valve.

FIGS. 13-17 illustrate another embodiment of the present self-cleaning flow shutoff valve. The valve 210 includes a housing 212 that includes an upstream section 214 and a downstream section 216 that may be formed as separate, adjoining pieces. The sections 214, 216 may be bonded or threaded together, for example. Further, each section 214, 216 is shaped generally as a stepped cylinder. Those of ordinary skill in the art will appreciate, however, that the housing 212 need not include separate inlet and downstream sections, and that the housing 212 may embody any other shape, such as a non-circular cylinder.

The housing 212 defines an inlet 220, an outlet 222, and a flow passage 221 extending from the inlet 220 to the outlet 222. The passage 221 includes a large diameter section 230 located in the upstream section 214. The large diameter section 230 extends to an inlet 232 of the downstream section 216. The larger diameter section 230 receives a flow-metering element 224, which is illustrated in detail in FIGS. 16 and 17. The illustrated flow-metering element 224 includes a generally cylindrical body wall or sleeve 225, and a cap section 227. The cap section 227, which is located at the downstream end 229 of the sleeve 225, is shaped substantially as a disk having a chamfer 231 on a downstream outer edge. A plurality of flow metering orifices 228 extends through the body wall 225 just upstream of the cap section 227. In the illustrated embodiment, eight circular orifices 228 are shown. However, those of ordinary skill in the art will appreciate that any number of orifices having any shapes may be used. An upstream end 233 of the sleeve 225 includes a plurality of L-shaped feet 235. In the illustrated embodiment, four feet 235 are shown. However, those of ordinary skill in the art will appreciate that any number of feet having any shape may be used.

Figure 13:
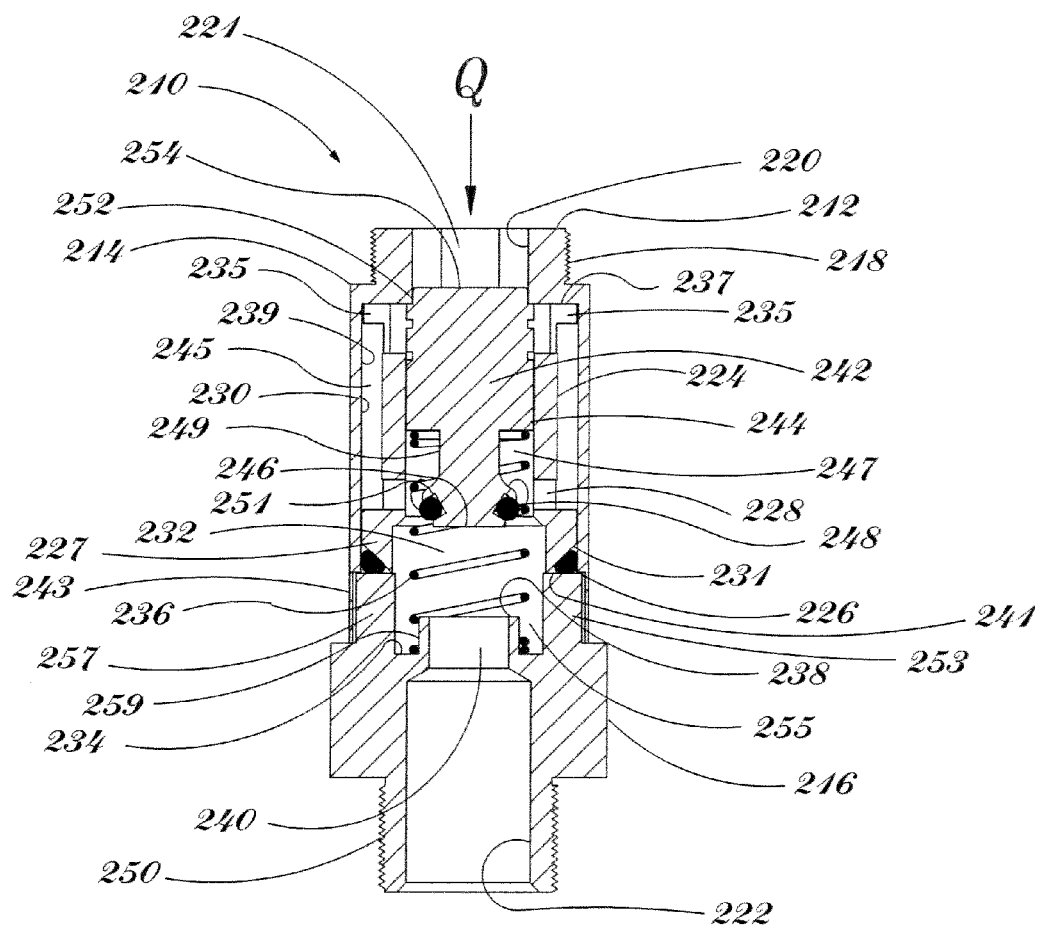
FIG. 13 is a side cross-sectional view of another embodiment of the present self-cleaning flow shutoff valve, in a position with no flow therethrough.
Figure 14:
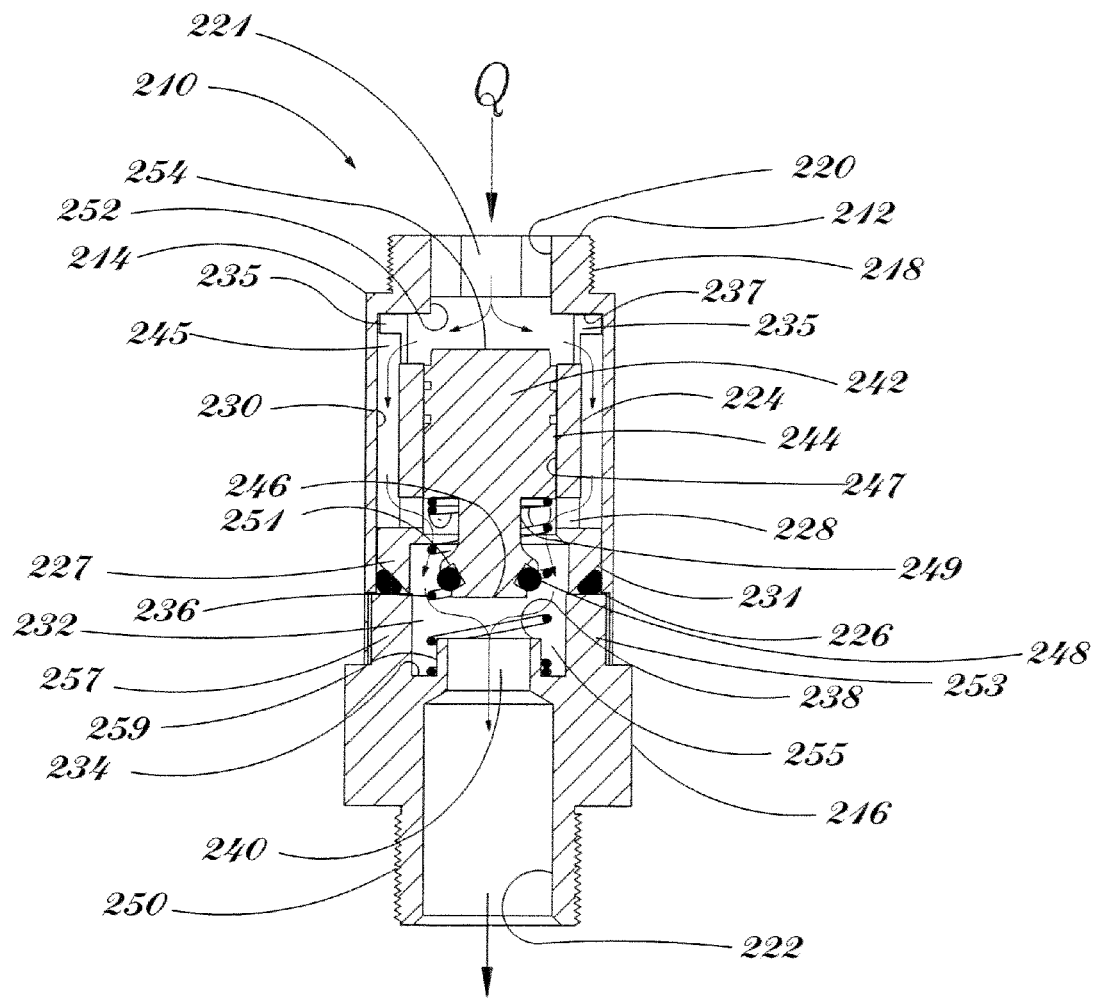
FIG. 14 is a side cross-sectional view of the self-cleaning flow shutoff valve of FIG. 13, in a normal flow position.
Figure 15:
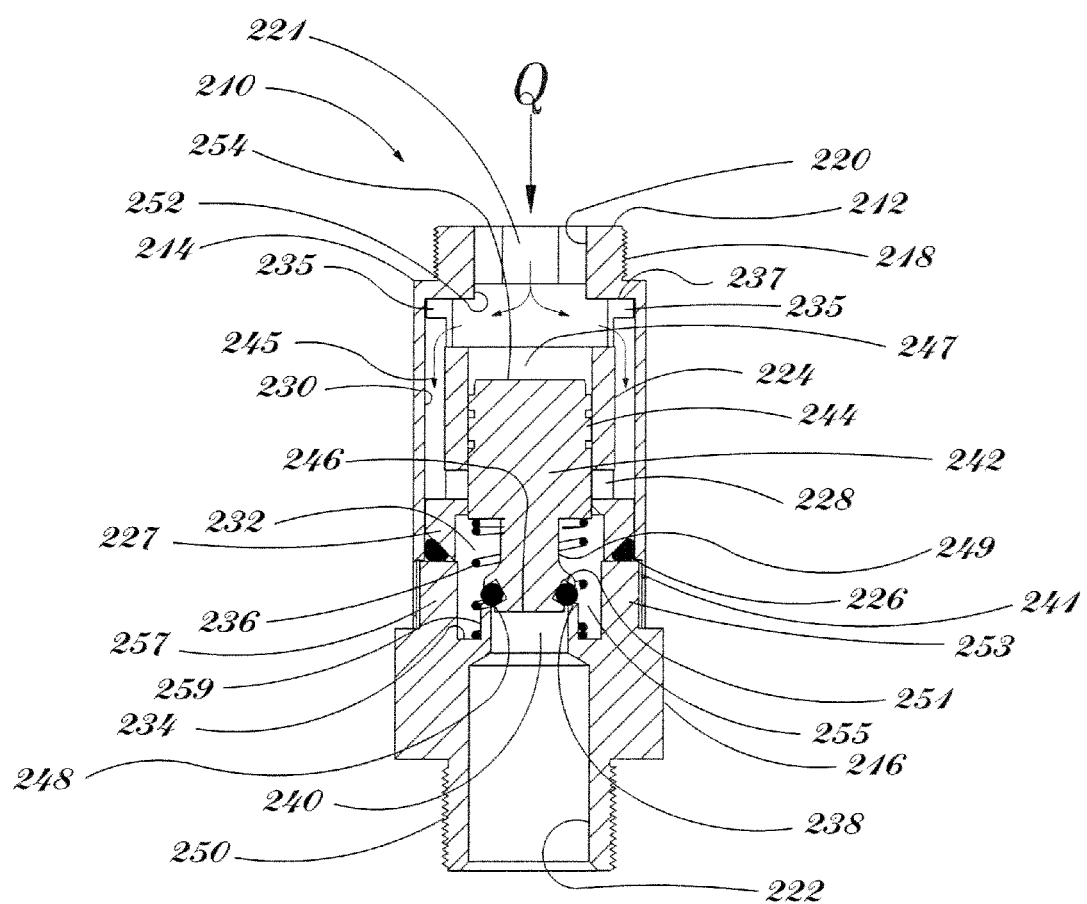
FIG. 15 is a side cross-sectional view of the self-cleaning flow shutoff valve of FIG. 13, in a shutoff position.
Figure 16:
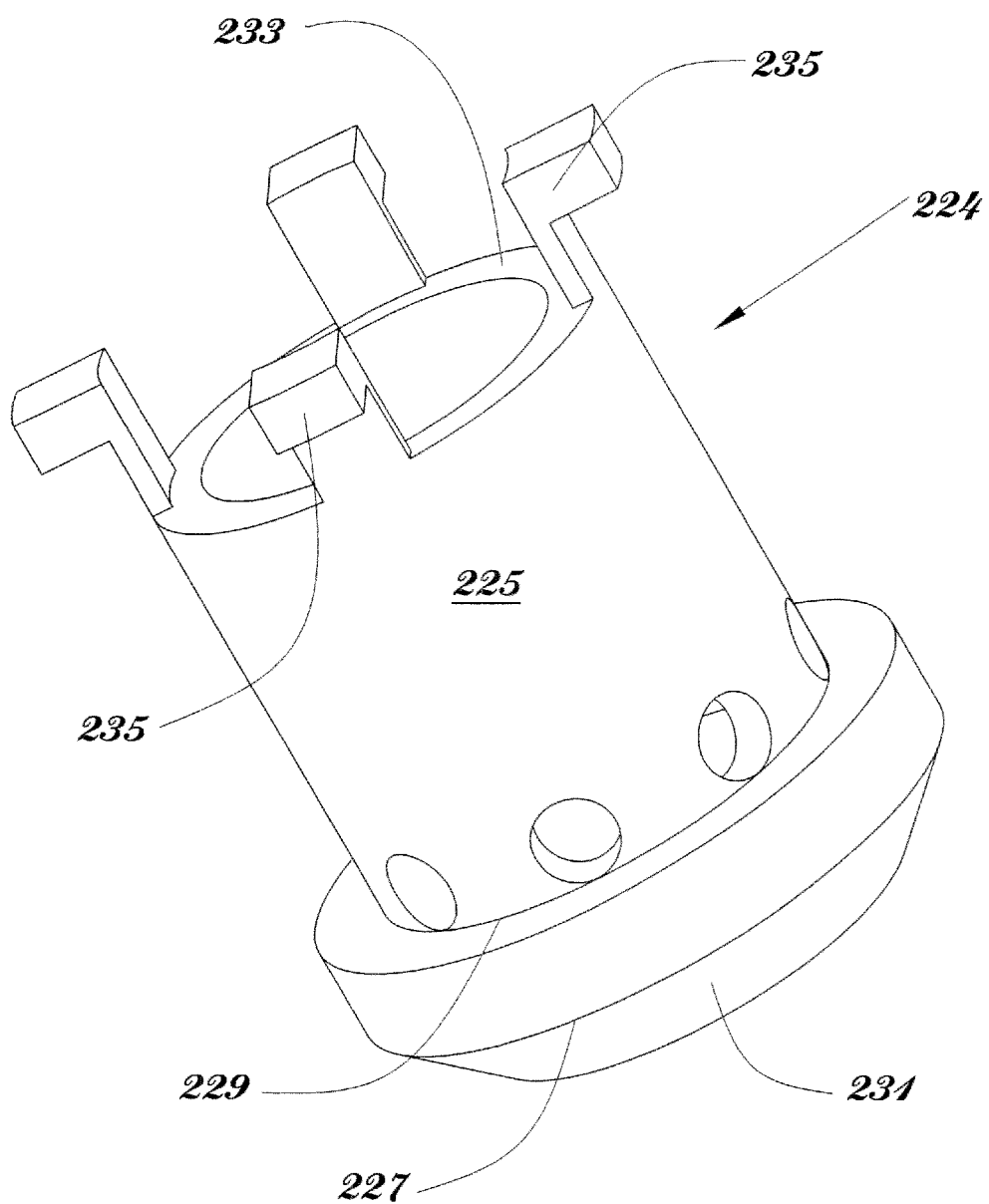
FIG. 16 is a bottom perspective view of a flow metering sleeve of the self-cleaning flow shutoff valve of FIG. 13.
Figure 17:
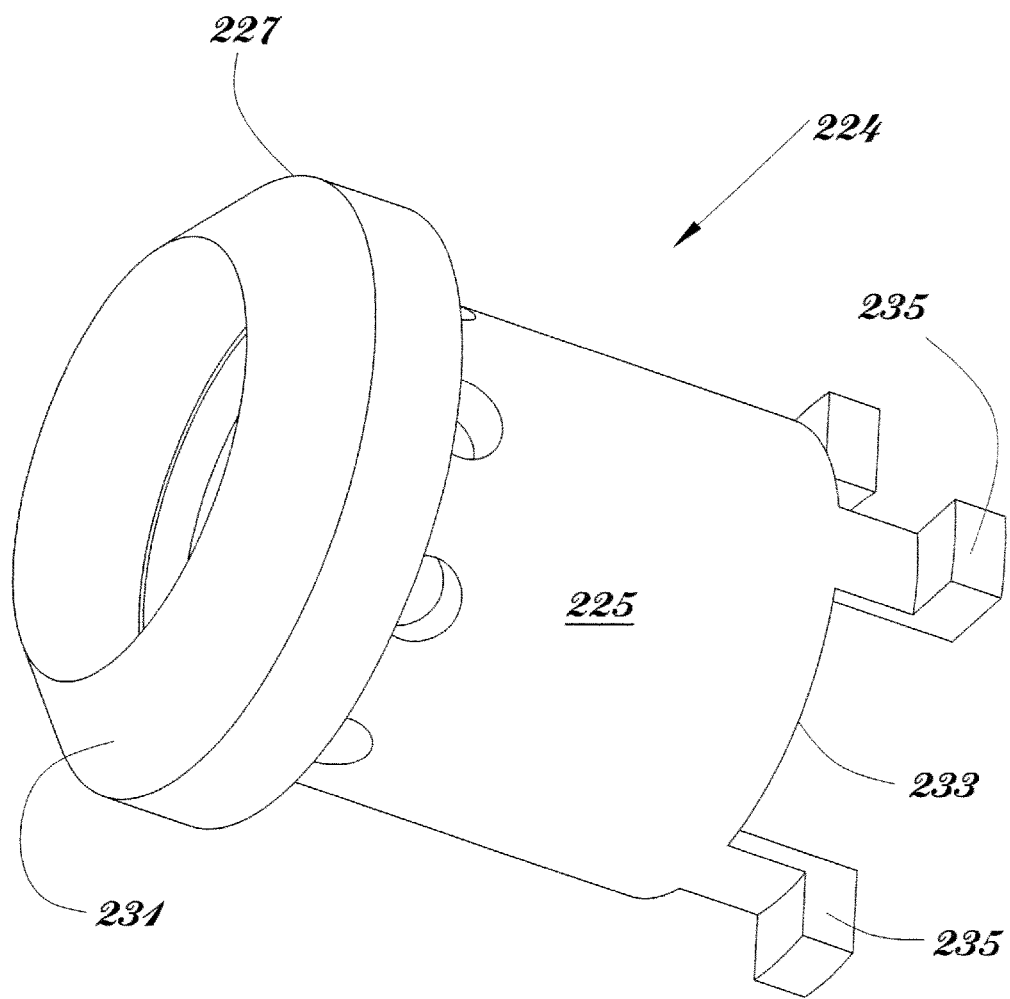
FIG. 17 is a top perspective view of the flow metering sleeve of FIG. 16.

As shown in FIGS. 13-15, the large diameter section 230 receives the flow-metering element 224, with the feet 235 abutting an upstream end wall 237 (FIG. 14) of the large diameter section 230. The feet 235 also abut an inner wall surface 239 (FIG. 13) of the large diameter section 230, substantially preventing any lateral movement of the element 224 within the large diameter section 230. The cap section 227 of the flow-metering element 224 abuts the downstream section 216, such that the element 224 cannot move along the longitudinal axis of housing 212. A sealing element 226 sandwiched between the chamfer 231 and an upstream end wall 241 (FIG. 13) of the downstream section 216 prevents water from passing around the outside of the cap section 227, and prevents water from leaking through the junction 243 of the upstream section 214 and the downstream section 216. The smaller diameter of the element 224 relative to the large diameter section 230 creates an annular space 245 through which water may flow as described in further detail below. In the illustrated embodiment, the sealing element 226 comprises a resilient O-ring. However, those of ordinary skill in the art will appreciate that the sealing element 226 could have other configurations.

An internal passage 247 of the flow-metering element 224 receives a valve element 242. In the illustrated embodiment, the valve element 242 is a poppet-type valve. However, those of ordinary skill in the art will appreciate that other types of valves may be used instead.

The valve element 242 is slidable along the axis of the element 224. In the illustrated embodiment, a body portion 244 of the valve element 242 is substantially cylindrical and sized to fit within the cylindrical passage 247 of the flow-metering element 224. The body portion 244 has a sufficient length and diameter so that it does not bind with the element 224 in axial movement. The body portion 244 also has a sufficient diameter to substantially prevent lateral movement of the valve element 242 relative to the element 224, and to prevent any substantial flow between the body portion 244 and the element 224. Those of ordinary skill in the art will appreciate that certain embodiments may allow some flow between the body portion 244 and the element 224.

The body portion 244 further contains a reduced diameter at its upstream end 254. The reduced diameter selectively fits into a counter-bored pocket 252 of the upstream section 214, as shown in FIG. 13 and as discussed in further detail below. A stem portion 249 of the valve element 242, located downstream of the body portion 244, includes a reduced diameter relative to the body portion 244. The stem portion 249 terminates in a sealing portion 246 spaced from the body portion 244. The sealing portion 246 includes a groove 251 in which a sealing element 248 seats. In the illustrated embodiment, the sealing element 248 comprises a resilient O-ring. However, those of ordinary skill in the art will appreciate that the sealing element 248 could have other configurations.

An upstream end 253 of the downstream section 216 of the housing 212 includes an annular cavity 255 formed between an outer cylindrical wall 257 and an inner cylindrical wall 259. An upstream end wall of the annular cavity 255 forms a seat 234 for a downstream end of a biasing member 236. In the illustrated embodiment, the biasing member 236 is a coil spring. However, those of ordinary skill in the art will appreciate that the biasing member 236 need not be a coil spring.

An upstream end of the biasing member 236 engages a downstream end wall of the body portion 244. The biasing member 236 is in compression, and thus biases the valve element 242 toward the upstream end of the housing 212. An upstream end of the inner cylindrical wall 259 forms a valve seat 238. The sealing element 248 selectively abuts the valve seat 238 to shut off flow through the valve 210, as shown in FIG. 15 and as described in further detail below.

FIGS. 13-15 illustrate three positions for the valve element 242, each of which corresponds to a different flow condition for the valve 210. FIG. 13 illustrates a no flow condition in which static line pressure is equalized throughout the valve 210 so that the valve element 242 is hydraulically balanced. In this condition the compressed biasing member 236 holds the valve element 242 at its farthest upstream position in which the reduced diameter upstream end 254 seats within the counter-bored pocket 252 of the upstream section 214. The sealing portion 246 is spaced from the valve seat 238. The valve element 242 does not cover the metering orifices 228.

FIG. 14 illustrates a normal flow condition in which the pressure downstream of the valve element 242 is lower than the pressure upstream of the valve element 242. Fluid flow across the metering orifices 228 may contribute to the lower pressure downstream. A flow rate through the valve 210 is below a threshold value at which the valve element 242 moves to the shutoff position shown in FIG. 15, which is described below. In the normal flow condition of FIG. 14, the valve element 242 is in an intermediate position, downstream from the no flow condition of FIG. 13. In the intermediate position of FIG. 14, the upstream end 254 of the valve element 242 is spaced from the counter-bored pocket 252. The compressed biasing member 236 counteracts the inlet biased water pressure to hold the valve element 242 in the intermediate position in which the sealing portion 246 is spaced from the valve seat 238, and the body portion 244 does not cover the flow metering orifices 228. In this condition water flows through the inlet 220, around the upstream end 254 of the valve element 242 and into the annular space 245 between the element 224 and the inner wall surface of the large diameter section 230. The water then flows through the metering orifices 228, around the stem portion 249 and through the outlet 222. Those of ordinary skill in the art will appreciate that the normal flow condition encompasses a range of positions for the valve element 242, including positions in which the valve element 242 is upstream and/or downstream from the position illustrated in FIG. 14.

FIG. 15 illustrates a shutoff condition in which a differential pressure bears on the valve element 242. The difference between the normal flow condition of FIG. 14 and the shutoff condition of FIG. 15 is the magnitude of the flow rate. In FIG. 14 the flow rate is below the threshold value, while in FIG. 15 the flow rate is above the threshold value. When there is a sudden sharp decrease in the water pressure in the outlet channel 240, there is a sudden sharp increase in flow through the valve 210. Such a sharp increase in flow may occur, for example, when a downstream hose breaks. The sudden flow increase forces the valve element 242 downstream against the spring force. If the flow rate rises above the threshold value, the spring force is overcome, and the sealing portion 246 is forced against the valve seat 238. The sealing element 248 abutting the valve seat 238 prevents any flow through the valve seat 238. Further, the body portion 244 covers the metering orifices 228. As long as the differential pressure across the valve element 242 remains high enough, the valve element 242 remains in the shutoff condition where the sealing element 248 abutting the valve seat 238 prevents flow through the valve 210. When the differential pressure reduces, the biasing member 236 forces the valve element 242 back upstream into either the normal flow condition (FIG. 14) or the no flow condition (FIG. 13).

Advantageously, as the valve element 242 moves from the normal flow position (FIG. 14) to the shutoff position (FIG. 15), the body portion 244 covers the metering orifices 228 prior to the sealing element 248 reaching the valve seat 238. This action of the body 244 covering the orifices 228 is effectively a "spool" valve closure. However, because of the lack of seals and the clearance fit between the valve element body 244 and the internal passage 247 of the flow-metering element 224 there is significant bypass leakage. The bypass leakage tends to dampen the closure. Once the orifices 228 are covered by the body 244 of the valve element 242, the differential pressure across the valve element 242 rises even higher above the threshold value and the valve element 242 then continues downstream until the sealing element 248 reaches the valve seat 238, effecting complete closure. This sealing progression reduces "chatter," or oscillation of the valve element 242 along the axis of the valve 210.

As the discussion above illustrates, the present flow shutoff valve 210 includes a flow restrictive passage 221 extending between the inlet 220 and the outlet 222. Fluid communication through the valve 210 is at least partially controlled by the size and number of the metering orifices 228 in the element 224. The characteristics of the biasing member 236 and the metering orifices 228 are empirically selected to accommodate desired maximum flow rates. For example, in one embodiment the desired maximum flow rates may be those required by household appliances, sinks, and toilets. Under the normal flow condition, flow resistance through the metering orifices 228 and general drag of the valve element 242 create a pressure drop across the valve element 242. The pressure drop creates differential forces on the valve element 242. However, the metering orifices 228 and the biasing member 236 are selected to allow flow through the valve 210 within a range required by the specific fixture to which water flows through the valve 210, with the biasing member 236 retaining the valve element 242 in the normal flow position. The biasing member 236 maintains a range of forces on the valve element 242 that the hydraulic forces do not overcome until the threshold flow induced differential pressure is reached, after which the valve element 242 moves to the shutoff position in which the sealing element 248 abuts the valve seat 238.

The back pressure at the outlet 222 influences the flow rate through the valve 210. This pressure is developed at an appliance, toilet valve, sink valve, or other device in fluid communication with the outlet 222. When the back pressure at the outlet 222 drops significantly, the differential pressure between the inlet 220 and the outlet 222 becomes substantially greater. In response, flow through the flow shutoff valve 210 increases. As the flow increases, the metering orifices 228 provide greater resistance. Resulting hydraulic forces, acting in the direction of flow, increase. In one embodiment, the hydraulic force on the valve element 242 exceeds the threshold value at a flow rate between 150% and 200% of the anticipated normal flow rate. Under this condition the valve element 242 is forced into the shutoff position (FIG. 15) as the spring force from the compressed biasing member 236 is overcome.

In the shutoff position there is no flow through the valve 210, and the pressure above the valve element 242 equalizes at the line pressure. The only forces on the valve element 242 are from the biasing member 236 and from the imbalance between the line pressure at the inlet 220 and the lower pressure at the outlet 222. The differential pressure retains the valve element 242 in the shutoff position. By reducing the inlet line pressure sufficiently to allow the biasing member 236 to force the valve element 242 back toward the inlet 220, flow through the valve 210 is re-established.

One advantage of the present flow shutoff valve 210 is that it is self-cleaning. Public water lines generally contain sediment that can build up around valves and joints in the line, eventually creating flow-stopping clogs. In the present flow shutoff valve 210, the valve element 242 is in the no flow position (FIG. 13) when pressure about the valve element 242 is equalized. When a differential pressure is applied to valve element 242, as when there is a drop in pressure downstream from valve element 242, the valve "pops" open suddenly, creating a flow surge through the valve 210. The flow surge releases any accumulated particles in the valve 210 and flushes them downstream out of the valve 210. This flushing occurs every time the valve element 242 pops from the no flow position (FIG. 13) to the normal flow position (FIG. 14), such as when a downstream supply valve is opened.

Figure 18:
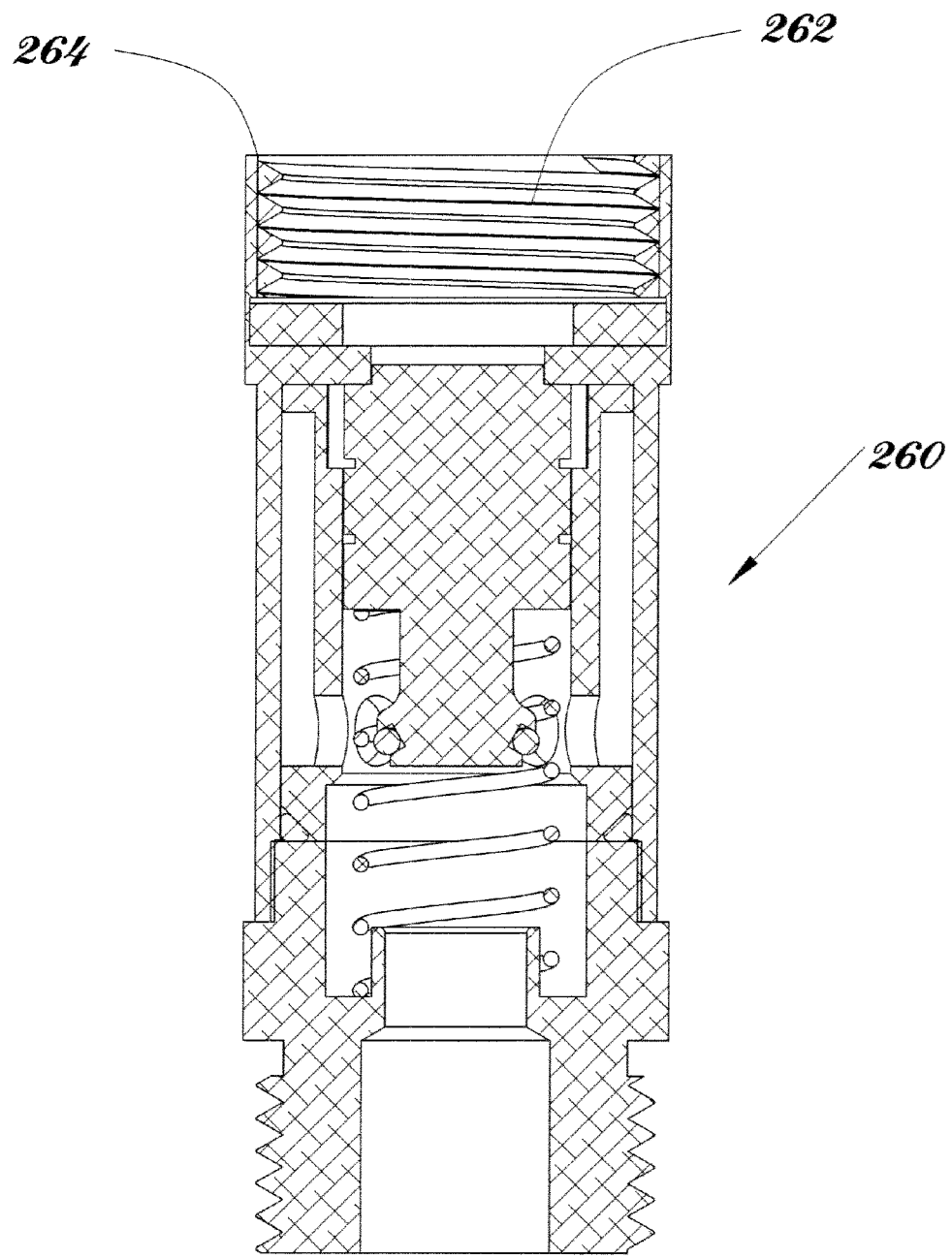
FIG. 18 is a side cross-sectional view of another embodiment of the present self-cleaning flow shutoff valve.

In the illustrated embodiment, the inlet 220 and the outlet 222 include male threads 218, 250. The inlet threads 218 may be configured to facilitate integration of the valve 210 into a standard commercial stop valve (not shown). The outlet threads 250 may be varied to match a broad range of plumbing requirements. In alternative embodiments, the valve 210 may be a non-integrated, stand-alone valve, in which case male or female threads may be provided at either end to fit any plumbing configuration. For example, FIG. 18 illustrates an alternative valve 260 having female threads 262 at an inlet end 264. The valve 260 is adapted for use with a clothes washer 66 (FIG. 6), which typically includes male threads on a water inlet hose.

Figure 19:
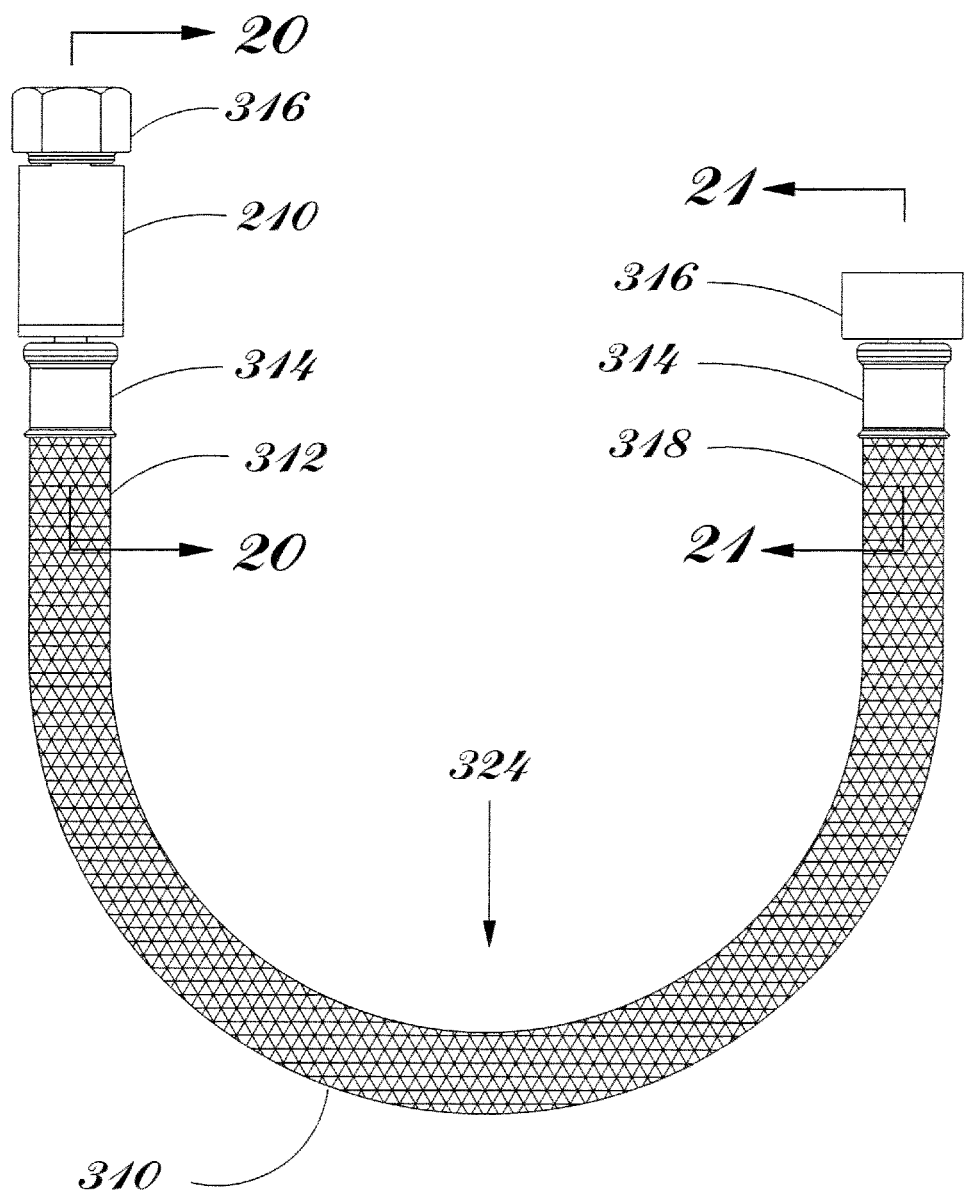
FIG. 19 is a side view of the self cleaning flow shutoff valve of FIG. 13 integrated into a commercial appliance service hose.
Figure 20:
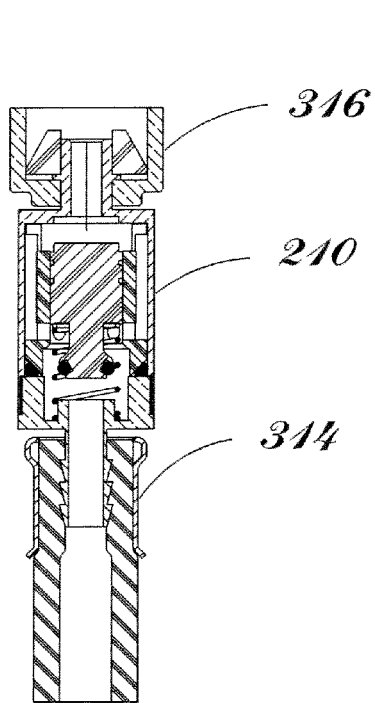
FIG. 20 is a side cross-sectional view of the inlet end of the hose of FIG. 19 taken along the line 20-20 of FIG. 29.
Figure 21:
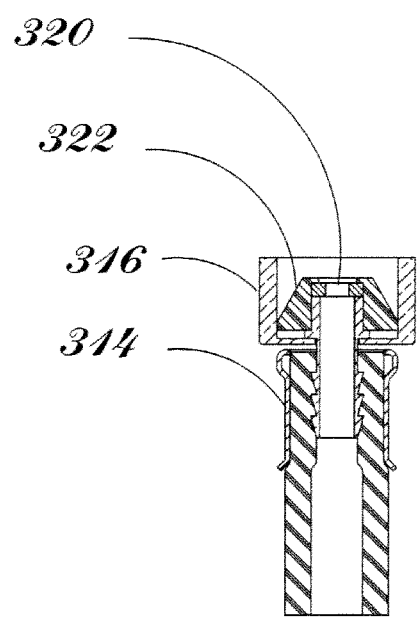
FIG. 21 is a side cross-sectional view of the outlet end of the hose of FIG. 19 taken along the line 21-21 of FIG. 19.

FIGS. 19-21 illustrate an alternative embodiment in which the present flow shutoff valve 210 is integrated into a commercial appliance service hose 310. With reference to FIGS. 19 and 20, an inlet end 312 of the hose 310 includes a crimp fitting 314 that engages and retains the valve 210. The inlet end 312 further includes a threaded fitting 316 upstream from the valve 210. With reference to FIGS. 19 and 21, an outlet end 318 includes a crimp fitting 314 that engages and retains a threaded fitting 316. With reference to FIG. 21, the fitting 316 includes a restrictive orifice 320 held in place by a modified commercial seal 322.

The hose assembly 324 is connectable to an appliance, such as a clothes washer 66 (FIG. 6), using the threaded fittings 316. The flow shutoff valve 210 is configured for a flow rate that is appropriate for the appliance with which it is used. For example, if it is used with a typical clothes washer, it may be sized for approximately 2½ gallons per minute (GPM) (9.6 liters per minute (LPM)) with a 3½ to 4 GPM (13.44 to 15.36 LPM) shutoff. Advantageously, the restrictive orifice 320 at the outlet end 318 of the hose assembly 324 restricts the actual flow rate through the hose to the desired rate. For example, if a hose having no restrictive orifice at the outlet end and a 2½ GPM (9.6 LPM) shutoff valve at the inlet end is installed on an appliance requiring 4 to 5 GPM (15.36 to 19.2 LPM), the shutoff valve would close prematurely. The restrictive orifice 320 on the hose assembly 324 restricts the actual flow to approximately 2½ to 3 GPM (9.6 to 11.52 LPM), thereby preventing premature closing of the shutoff valve.

SCOPE OF THE INVENTION

The above description presents the best mode contemplated for carrying out the present self-cleaning flow shutoff valve and associated methods, and of the manner and process of making and using it, in such full, clear, concise, and exact terms as to enable any person skilled in the art to which it pertains to make and use this valve. This valve is, however, susceptible to modifications and alternate constructions from that discussed above that are fully equivalent. Consequently, this valve is not limited to the particular embodiments disclosed. On the contrary, this valve covers all modifications and alternate constructions coming within the spirit and scope of the valve as generally expressed by the following claims, which particularly point out and distinctly claim the subject matter of the valve.

What is claimed is:

1. A self cleaning flow shutoff valve configured to be installed in a water line to stop flow in response to an excess water flow condition, the valve comprising:
   a housing defining a flow passage and a valve seat;
   a flow-metering element positioned within the flow passage, the flow-metering element including a flow metering aperture on a downstream portion thereof, the flow metering aperture providing fluid communication through a body wall of the element;
   a valve member slidably mounted within the flow-metering element, the valve member being movable between a no flow position, a normal flow position and a shutoff position, a downstream end of the valve member including a sealing portion configured to selectively engage the valve seat; and
   a biasing element disposed between the housing and the valve member so as to bias the valve member away from the valve seat;
   wherein (a) when the valve member is in the no flow position, an upstream end of the valve member engages the housing adjacent an inlet end of the housing, the sealing portion is spaced from the valve seat, and the valve member does not cover the flow metering aperture; (b) when the valve member is in the normal flow position, the upstream end of the valve member is spaced from the housing, the sealing portion is spaced from the valve seat, and the valve member does not cover the flow metering aperture; and (c) when the valve member is in the shutoff position, the upstream end of the valve member is spaced from the housing, the sealing portion engages the valve seat, and the valve member covers the flow metering aperture.

2. The flow shutoff valve of claim 1, wherein the housing comprises an upstream section and a downstream section.

3. The flow shutoff valve of claim 2, wherein the upstream and downstream sections are separate components that adjoin one another.

4. The flow shutoff valve of claim 1, wherein a portion of the housing located downstream from the valve member defines the valve seat.

5. The flow shutoff valve of claim 1, wherein the flow-metering element includes a cylindrical section and a cap section at a downstream end of the cylindrical section.

6. The flow shutoff valve of claim 5, wherein the flow metering aperture is located adjacent to and upstream from the cap section.

7. The flow shutoff valve of claim 5, wherein the cap section includes a chamfer about its downstream, outer edge.

8. The flow shutoff valve of claim 7, further comprising a sealing element positioned between the chamfer and the housing.

9. The flow shutoff valve of claim 1, wherein the valve member sealing portion comprises a resilient O-ring seal.

10. The flow shutoff valve of claim 1, further comprising a plurality of flow metering apertures extending through the flow-metering element body wall.

11. The flow shutoff valve of claim 1, wherein when the valve member is in the normal flow position water flows past the upstream end of the valve member, then through an annular space defined between an inner surface of the housing and an outer surface of the flow-metering element, then through the flow metering aperture and around a downstream end of the valve member and then past the valve seat.

12. The flow shutoff valve of claim 1 in combination with a hose, the flow shutoff valve being integrated into an inlet end of the hose.

13. The flow shutoff valve/hose combination of claim 12, further comprising a flow restricting orifice at an outlet end of the hose.

14. A method of stopping flow in a water line in response to an excess water flow condition, the method comprising the steps of:
   beginning with a flow shutoff valve in the water line in a no flow position in which an upstream end of a valve member engages a housing of the valve adjacent an inlet end of the housing, a sealing portion of the valve member is spaced from a valve seat located downstream of the valve member, and the valve member does not cover the flow metering aperture;
   creating a differential pressure across the valve member in which a downstream water pressure is less than an upstream water pressure to move the valve member to a normal flow position in which the upstream end of the valve member is spaced from the housing, the sealing portion is spaced from the valve seat, and the valve member does not cover the flow metering aperture; and
   increasing a water flow rate across the valve member above a threshold flow rate to move the valve member to a shutoff position in which the upstream end of the valve member is spaced from the housing, the sealing portion engages the valve seat, and the valve member covers the flow metering aperture;
   wherein, when the valve member is in the normal flow position, water flows past the upstream end of the valve member, then through an annular space defined between an inner surface of the housing and an outer surface of the flow-metering element, then through the flow metering aperture and around a downstream end of the valve member and then past the valve seat.

15. The method of claim 14, wherein when the valve member moves from the no flow position to the normal flow position movement of the valve element and a sudden surge of water through the valve purges sediment from the valve.

16. The method of claim 14, wherein the housing comprises an upstream section and a downstream section formed as separate components that adjoin one another.

17. The method of claim 14, wherein a portion of the housing located downstream from the valve member defines the valve seat.

18. The method of claim 14, wherein the flow-metering element includes a cylindrical section and a cap section at a downstream end of the cylindrical section.

19. The method of claim 18, wherein the flow metering aperture is located adjacent to and upstream from the cap section.

20. The method of claim 18, wherein the cap section includes a chamfer about its downstream, outer edge.

21. The method of claim 20, further comprising a sealing element positioned between the chamfer and the housing.

22. The method of claim 14, wherein the valve member sealing portion comprises a resilient O-ring seal.

* * * * *